(12) United States Patent
Rothwell et al.

(10) Patent No.: US 9,314,962 B2
(45) Date of Patent: Apr. 19, 2016

(54) METHOD OF SEPARATING STRANDS ON A STRETCHING SURFACE

(71) Applicant: 3M INNOVATIVE PROPERTIES COMPANY, St. Paul, MN (US)

(72) Inventors: Neal C. Rothwell, Bury (GB); Peter J. Bugeja, Bolton (GB); Thomas J. Gilbert, St. Paul, MN (US); Kristopher K. Biegler, Minneapolis, MN (US); Mark A. Peltier, Forest Lake, MN (US); Ryan M. Luepke, New Brighton, MN (US); Steven J. Perron, St. Paul, MN (US); Timothy J. Diekmann, Maplewood, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 295 days.

(21) Appl. No.: 13/891,287

(22) Filed: May 10, 2013

(65) Prior Publication Data
US 2014/0332999 A1    Nov. 13, 2014

(51) Int. Cl.
| | |
|---|---|
| *B29C 55/08* | (2006.01) |
| *D01D 10/04* | (2006.01) |
| *D01D 5/42* | (2006.01) |
| *B26D 3/10* | (2006.01) |
| *A44B 18/00* | (2006.01) |

(52) U.S. Cl.
CPC ............... *B29C 55/08* (2013.01); *D01D 5/426* (2013.01); *D01D 10/04* (2013.01); *A44B 18/0046* (2013.01); *B26D 3/10* (2013.01)

(58) Field of Classification Search
None
See application file for complete search history.

(56) References Cited

U.S. PATENT DOCUMENTS

| | | | |
|---|---|---|---|
| 3,252,181 A | 5/1966 | Hureau | |
| 3,616,154 A | 10/1971 | Dow et al. | |
| 3,645,433 A | 2/1972 | Lucas et al. | |
| 3,724,737 A | 4/1973 | Bodnar | |
| 3,985,599 A | 10/1976 | Lepoutre et al. | |
| 3,985,600 A | 10/1976 | Blais | |

(Continued)

FOREIGN PATENT DOCUMENTS

| | | |
|---|---|---|
| EP | 0191355 | 8/1986 |
| EP | 0755665 | 1/1997 |

(Continued)

OTHER PUBLICATIONS

International Search Report for PCT/US2014/037088, Dated Sep. 3, 2014.

(Continued)

*Primary Examiner* — Benjamin Schiffman

(57) ABSTRACT

A method of separating strands of a slit web is disclosed. The method includes providing a slit web having a length in a machine direction and running the slit web in the machine direction onto a stretchable surface. The slit web includes multiple strands provided by a plurality of slits extending in a first direction not parallel to a cross-machine direction. The slit web is in contact with the stretchable surface for a path length in the machine direction, and for at least a portion of the path length, the stretchable surface is stretching in the cross-machine direction. The traction between the slit web and the stretchable surface during the stretching at least partially separates at least some of the multiple strands of the slit web in a second direction transverse to the first direction. A method of increasing a width of a polymeric netting is also disclosed.

21 Claims, 6 Drawing Sheets

(56) References Cited

U.S. PATENT DOCUMENTS

| | | |
|---|---|---|
| 4,001,366 A | 1/1977 | Brumlik |
| 4,152,479 A | 5/1979 | Larsen |
| 4,176,775 A | 12/1979 | Brendemuehl |
| 4,239,141 A | 12/1980 | Frye |
| 4,288,884 A | 9/1981 | Bahls |
| 4,294,240 A | 10/1981 | Thill |
| 4,560,372 A | 12/1985 | Pieniak |
| 4,676,784 A | 6/1987 | Erdman |
| 4,775,310 A | 10/1988 | Fischer |
| 4,842,794 A | 6/1989 | Hovis et al. |
| 4,862,565 A | 9/1989 | Damour |
| 4,925,080 A | 5/1990 | Crouse et al. |
| 4,969,970 A | 11/1990 | Suzuki |
| 5,043,036 A * | 8/1991 | Swenson ............... 156/160 |
| 5,077,870 A | 1/1992 | Melbye et al. |
| 5,207,962 A | 5/1993 | Hovis et al. |
| 5,232,533 A | 8/1993 | Tani et al. |
| 5,256,231 A | 10/1993 | Gorman et al. |
| 5,260,015 A | 11/1993 | Kennedy |
| 5,290,377 A | 3/1994 | Aihara et al. |
| 5,308,345 A * | 5/1994 | Herrin ............... 604/385.27 |
| 5,397,316 A | 3/1995 | LaVon |
| 5,419,695 A | 5/1995 | Clegg |
| 5,461,760 A | 10/1995 | Damour |
| 5,476,437 A | 12/1995 | Damour |
| 5,517,737 A * | 5/1996 | Viltro et al. ............... 26/88 |
| 5,560,793 A * | 10/1996 | Ruscher et al. ............. 156/73.1 |
| 5,605,729 A | 2/1997 | Mody et al. |
| 5,611,790 A | 3/1997 | Osborn, III |
| 5,628,097 A | 5/1997 | Benson et al. |
| 5,660,666 A | 8/1997 | Dilnik |
| 5,692,271 A | 12/1997 | Provost |
| 5,713,881 A | 2/1998 | Rezai |
| 5,729,878 A | 3/1998 | Kurihara |
| 5,776,343 A | 7/1998 | Cullen et al. |
| 5,891,549 A | 4/1999 | Beretta |
| 5,953,797 A | 9/1999 | Provost et al. |
| 6,093,870 A | 7/2000 | Carlsson |
| 6,132,660 A | 10/2000 | Kampfer |
| 6,146,369 A | 11/2000 | Hartman |
| 6,190,594 B1 | 2/2001 | Gorman et al. |
| 6,262,331 B1 | 7/2001 | Nakahata |
| 6,287,665 B1 | 9/2001 | Hammer |
| 6,391,420 B1 | 5/2002 | Cederblad |
| 6,419,667 B1 | 7/2002 | Avalon |
| 6,481,063 B2 | 11/2002 | Shepard |
| 6,489,003 B1 | 12/2002 | Levitt |
| 6,531,207 B1 | 3/2003 | Eaton |
| 6,554,754 B2 | 4/2003 | VanRens |
| 6,582,642 B1 | 6/2003 | Buzzell |
| 6,627,133 B1 | 9/2003 | Tuma |
| 6,835,256 B2 | 12/2004 | Menzies |
| 6,843,762 B2 | 1/2005 | Munche et al. |
| 6,973,702 B2 | 12/2005 | Harashige |
| 6,984,412 B2 | 1/2006 | Tanaka |
| 7,001,475 B2 | 2/2006 | Ausen |
| 7,014,906 B2 | 3/2006 | Tuman |
| 7,048,818 B2 | 5/2006 | Krantz |
| 7,048,984 B2 | 5/2006 | Seth |
| 7,125,400 B2 | 10/2006 | Igaue |
| 7,198,743 B2 | 4/2007 | Tuma |
| 7,214,334 B2 | 5/2007 | Jens et al. |
| 7,219,403 B2 | 5/2007 | Miyamoto |
| 7,223,314 B2 | 5/2007 | Provost |
| 7,241,483 B2 | 7/2007 | Ausen |
| 7,371,302 B2 | 5/2008 | Miyamoto |
| 7,407,496 B2 | 8/2008 | Petersen |
| 7,622,180 B2 | 11/2009 | Seth |
| 7,695,799 B2 | 4/2010 | Cree |
| 7,855,316 B2 | 12/2010 | Meyer et al. |
| 7,897,078 B2 | 3/2011 | Petersen |
| 8,020,262 B2 | 9/2011 | Oertel |
| 8,889,243 B2 | 11/2014 | Hanschen |
| 9,138,031 B2 | 9/2015 | Wood |
| 9,138,957 B2 | 9/2015 | Wood |
| 9,155,669 B2 | 10/2015 | Petersen |
| 2002/0112325 A1 | 8/2002 | Keohan |
| 2003/0008106 A1 | 1/2003 | Guenther |
| 2003/0130644 A1 | 7/2003 | Baker |
| 2003/0229326 A1 | 12/2003 | Hovis et al. |
| 2004/0147890 A1 | 7/2004 | Nakahata et al. |
| 2004/0261230 A1 | 12/2004 | Neeb |
| 2004/0261232 A1 | 12/2004 | Kurtz, Jr. |
| 2005/0123720 A1 | 6/2005 | Suzuki et al. |
| 2006/0288547 A1 | 12/2006 | Jackson |
| 2007/0107571 A1 | 5/2007 | Saeki |
| 2007/0134489 A1 | 6/2007 | Neugebauer |
| 2009/0311465 A1 | 12/2009 | De Jong |
| 2010/0100022 A1 | 4/2010 | Greener |
| 2010/0179463 A1 | 7/2010 | Greener |
| 2011/0147475 A1 | 6/2011 | Biegler et al. |
| 2011/0151171 A1 | 6/2011 | Biegler et al. |
| 2012/0011685 A1 | 1/2012 | Rocha |
| 2012/0086145 A1 | 4/2012 | Nakamura |
| 2012/0204383 A1 * | 8/2012 | Wood et al. ............... 24/306 |
| 2012/0330266 A1 | 12/2012 | Zonneveld et al. |
| 2014/0142533 A1 | 5/2014 | Peltier |
| 2014/0234606 A1 | 8/2014 | Ausen |
| 2014/0349062 A1 | 11/2014 | Chandrasekaran |
| 2014/0349079 A1 | 11/2014 | Chandrasekaran |
| 2015/0079337 A1 | 3/2015 | Ausen |
| 2015/0096659 A1 | 4/2015 | Gilbert |
| 2015/0096660 A1 | 4/2015 | Gilbert |

FOREIGN PATENT DOCUMENTS

| | | |
|---|---|---|
| EP | 1066008 | 3/2004 |
| EP | 2277682 | 1/2011 |
| GB | 821959 | 10/1959 |
| GB | 914489 | 1/1960 |
| GB | 1055963 | 1/1967 |
| GB | 1075487 | 7/1967 |
| GB | 1275541 | 5/1972 |
| GB | 2017485 | 10/1979 |
| JP | 2010-29532 | 2/2010 |
| WO | 9402091 | 2/1994 |
| WO | 9610481 | 4/1996 |
| WO | 2004-091437 | 10/2004 |
| WO | 2005-122818 | 12/2005 |
| WO | 2011-163020 | 12/2011 |
| WO | 2012-112768 | 8/2012 |
| WO | 2013-032683 | 3/2013 |
| WO | 2013-052371 | 4/2013 |
| WO | 2013-170480 | 11/2013 |
| WO | 2014-164242 | 10/2014 |

OTHER PUBLICATIONS

US 5,389,416, 02/1995, Mody et al. (withdrawn)

* cited by examiner

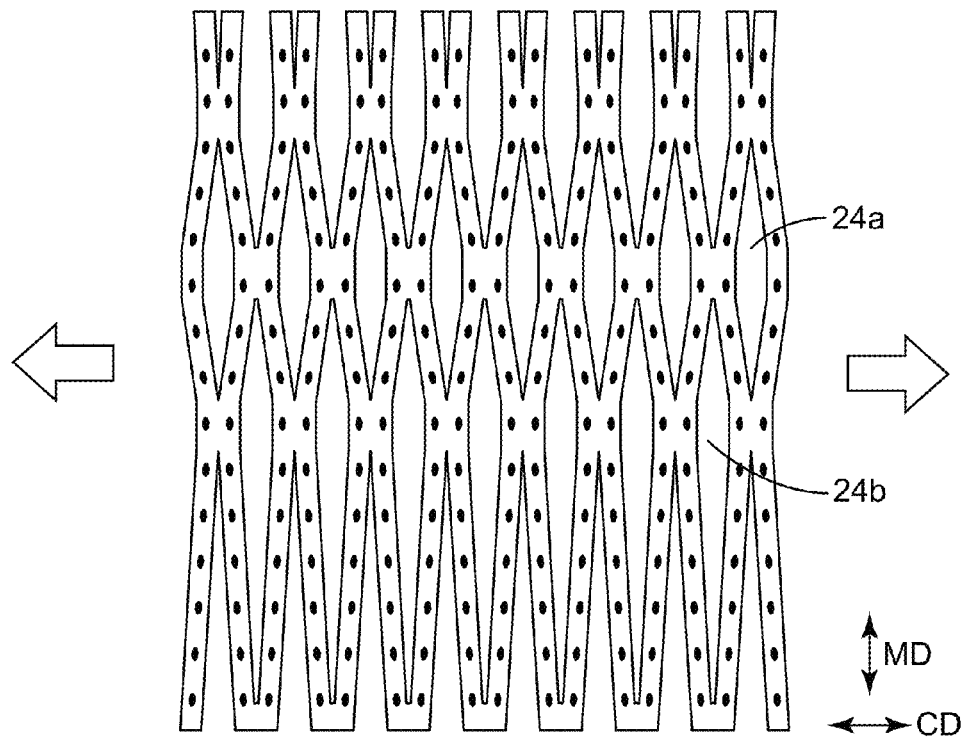
FIG. 3B
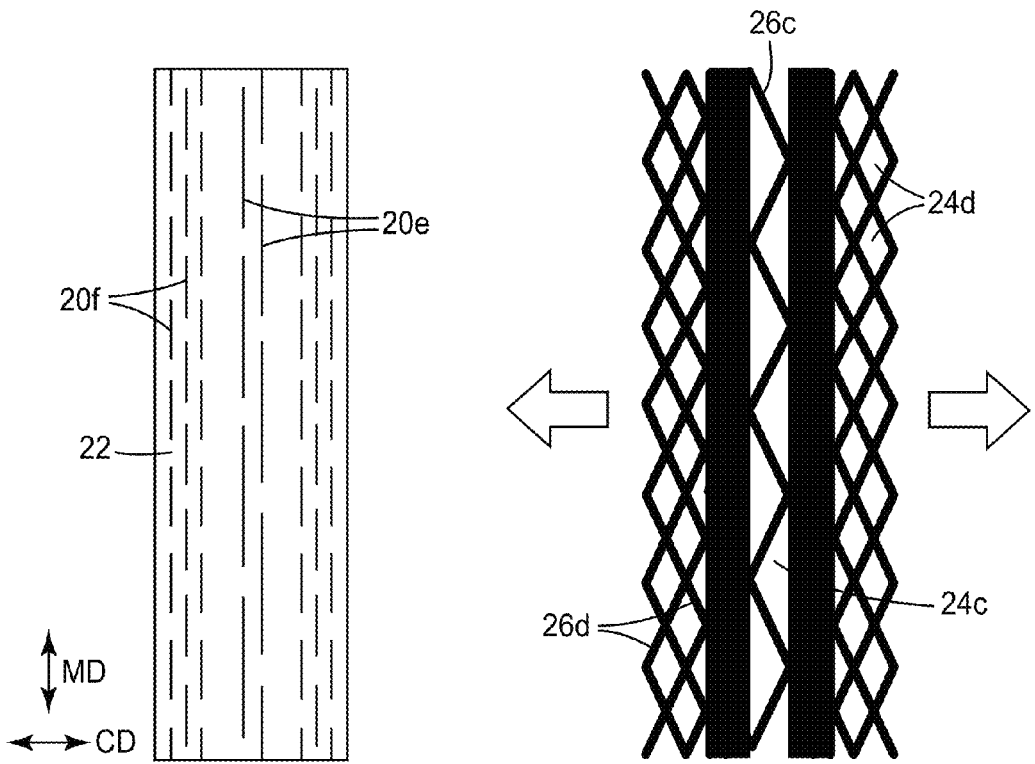
FIG. 4A
FIG. 4B

METHOD OF SEPARATING STRANDS ON A STRETCHING SURFACE

BACKGROUND

Slitting films during a continuous web process can be useful for providing multiple smaller films of a desired size. In some applications it is desirable to use multiple strips of a film in a single product or to use an apertured film to enhance some performance aspect of the product.

Some hook members have been made with openings in the backing from which the hooks project. See, e.g., U.S. Pat. No. 4,001,366 (Brumlik) and U.S. Pat. No. 7,407,496 (Peterson), U.S. Pat. Appl. Pub. No. 2012/0204383 (Wood et al.), and Int. Pat. Appl. Pub. Nos. WO 2005/122818 (Ausen et al.) and WO 1994/02091 (Hamilton). Also, laminates with separated mechanical fastening strips are described in U.S. Pat. Appl. Pub. No. 2007/0039142 (Petersen et al.) and Int. Pat. Appl. Pub. No. WO2011/163020 (Hauschildt et al.).

Some nonwoven materials have been made with openings. Such nonwovens have been attached to elastics or extensible pleated backings. See, e.g., U.S. Pat. Appl. Pub. No. 2004/0147890 (Nakahata et al.), Int. Pat. Appl. Pub. No. WO 1996/10481 (Abuto et al.), and European Patent No. EP 1066008 B1 (Eaton et al.). A reticulated mechanical fastening patch having loops is described in U.S. Pat. Appl. Pub. No. 2012/0330266 (Zonneveld et al.).

SUMMARY

The present disclosure provides a method of separating strands of a slit web using a web process. The process can be useful when the slit web includes full slits or slits interrupted by intact bridging regions of the web. In some cases, the slit and spread web comprises openings made from multiple strands of a slit web with the strands attached to each other at bridging regions of the web and separated from each other between at least some of the bridging regions. The method includes spreading the slit web in a direction transverse to the slits by feeding the slit web in the machine direction over a surface that stretches in the cross-machine direction. A polymeric netting can also be widened using the method disclosed herein.

In one aspect, the present disclosure provides a method of separating strands of a slit web. The method includes providing a slit web having a length in a machine direction and running the slit web in the machine direction onto a stretchable surface. The slit web includes multiple strands provided by a plurality of slits extending in a first direction not parallel to a cross-machine direction. The slit web is in contact with the stretchable surface for a path length in the machine direction, and for at least a portion of the path length, the stretchable surface is stretching in the cross-machine direction. The traction between the slit web and the stretchable surface during the stretching at least partially separates at least some of the multiple strands of the slit web in a second direction transverse to the first direction.

In another aspect, the present disclosure provides a method of increasing a width of a polymeric netting. The method includes providing a polymeric netting having a length in a machine direction and running the polymeric netting in the machine direction onto a stretchable surface. The polymeric netting is in contact with the stretchable surface for a path length in the machine direction, and for at least a portion of the path length, the stretchable surface is stretching in the cross-machine direction. Traction between the polymeric netting and the stretchable surface during stretching increases the width of at least a portion of the polymeric netting in the cross-machine direction.

In some embodiments of the foregoing aspects, running the slit web or the polymeric netting in the machine direction includes running the slit web or the polymeric netting over a roller comprising two rotating diverging disks that are laterally spaced and have the stretchable surface between them that stretches in the cross-machine direction for a portion of a rotation of the two rotating diverging disks. In some embodiments, the slit web or polymeric netting has mechanical fastening elements (e.g., male fastening elements) on at least one major surface. In these embodiments, it should be understood that the method disclosed herein is also a method of making a mechanical fastener.

The degree of separation of the strands in the methods disclosed herein may be adjusted based upon, for example, the desired appearance, weight, or cost in the final product.

The method disclosed herein may be useful, in some embodiments, for making a reticulated mechanical fastening web, laminate, strip, or patch that has a unique and attractive appearance. The method according to any of the above aspects allows openings to be provided or widened in a mechanical fastener without wasteful material loss. The openings can provide breathability and flexibility to a mechanical fastener, which may enhance the comfort of the wearer, for example, of an absorbent article comprising the mechanical fastener made by the method disclosed herein. The mechanical fastener also is typically able to cover a relatively large area with a relatively small amount of material, which may lower its cost. Also, because of the large area that may be covered by the mechanical fastener in an absorbent article, the mechanical fastener may provide performance enhancement, for example, by resist shifting forces such as torsional or rotational forces caused by movement of the wearer of the absorbent article. For example, in use, fitting an absorbent article such as a diaper about the wearer usually requires the front and back waist portions of the diaper to overlap each other. As the diaper is worn the movements of the wearer tend to cause the overlapping front and back waist portions to shift position relative to each other. Unless such shifting is limited, the fit and containment characteristics of the diaper may be degraded as the diaper is worn. A mechanical fastener made according to the present disclosure may provide improved fit and closure stability by resisting such shifting because of its relatively larger area and flexibility.

In this application, terms such as "a", "an" and "the" are not intended to refer to only a singular entity, but include the general class of which a specific example may be used for illustration. The terms "a", "an", and "the" are used interchangeably with the term "at least one". The phrases "at least one of" and "comprises at least one of" followed by a list refers to any one of the items in the list and any combination of two or more items in the list. All numerical ranges are inclusive of their endpoints and non-integral values between the endpoints unless otherwise stated.

The terms "first" and "second" are used in this disclosure. It will be understood that, unless otherwise noted, those terms are used in their relative sense only. For these components, the designation of "first" and "second" may be applied to directions, features, or components merely as a matter of convenience in the description of one or more of the embodiments.

The terms "multiple" and "a plurality" refer to more than one.

The term "opening" should be understood to be a void space in the web that is surrounded by web material. One opening is typically enclosed by two of the multiple strands.

The term "web" can refer to a continuous or running web, sometimes having an indefinite length. A web can typically be handled in a roll-to-roll process. The term "machine direction" (MD) as used above and below denotes the direction of a running web of material during a manufacturing process. When a strip is cut from a continuous web, the machine direction corresponds to the length "L" of the strip. As used herein, the terms "machine direction" and "longitudinal direction" are typically used interchangeably. The term "cross-machine direction" (CD) as used above and below denotes the direction which is essentially perpendicular to the machine direction. When a strip is cut from a continuous web, the cross-machine direction corresponds to the width "W" of the strip. In some embodiments of the method disclosed herein, the first direction is the machine direction, and the second direction is the cross-machine direction, but this is not a requirement.

The term "stretchable" refers to a material that can be extended or elongated in the direction of an applied stretching force without destroying the structure of the material or material fibers. An elastic material is a stretchable material that has recovery properties. In some embodiments, a stretchable material may be stretched to a length that is at least about 5, 10, 15, 20, 25, or 50 percent greater than its relaxed length without destroying the structure of the material or material fibers.

The term "elastic" refers to any material (such as a film that is 0.002 mm to 0.5 mm thick) that exhibits recovery from stretching or deformation. In some embodiments, a material may be considered to be elastic if, upon application of a stretching force, it can be stretched to a length that is at least about 25 (in some embodiments, 50) percent larger than its initial length and can recover at least 40, 50, 60, 70, 80, or 90 percent of its elongation upon release of the stretching force.

The above summary of the present disclosure is not intended to describe each disclosed embodiment or every implementation of the present disclosure. The description that follows more particularly exemplifies illustrative embodiments. It is to be understood, therefore, that the drawings and following description are for illustration purposes only and should not be read in a manner that would unduly limit the scope of this disclosure.

BRIEF DESCRIPTION OF THE DRAWINGS

The disclosure may be more completely understood in consideration of the following detailed description of various embodiments of the disclosure in connection with the accompanying drawings, in which:

FIG. 3B is a top view of a portion of the slit web shown in FIG. 3A after it is spread according to the method disclosed herein;

FIG. 4A is a schematic top view of another embodiment of a portion of a slit web useful for the methods of making a mechanical fastener disclosed herein;

FIG. 4B is a schematic top view of the portion of the slit web of FIG. 4A after it is spread according to the method disclosed herein;

DETAILED DESCRIPTION

Figure 1A:
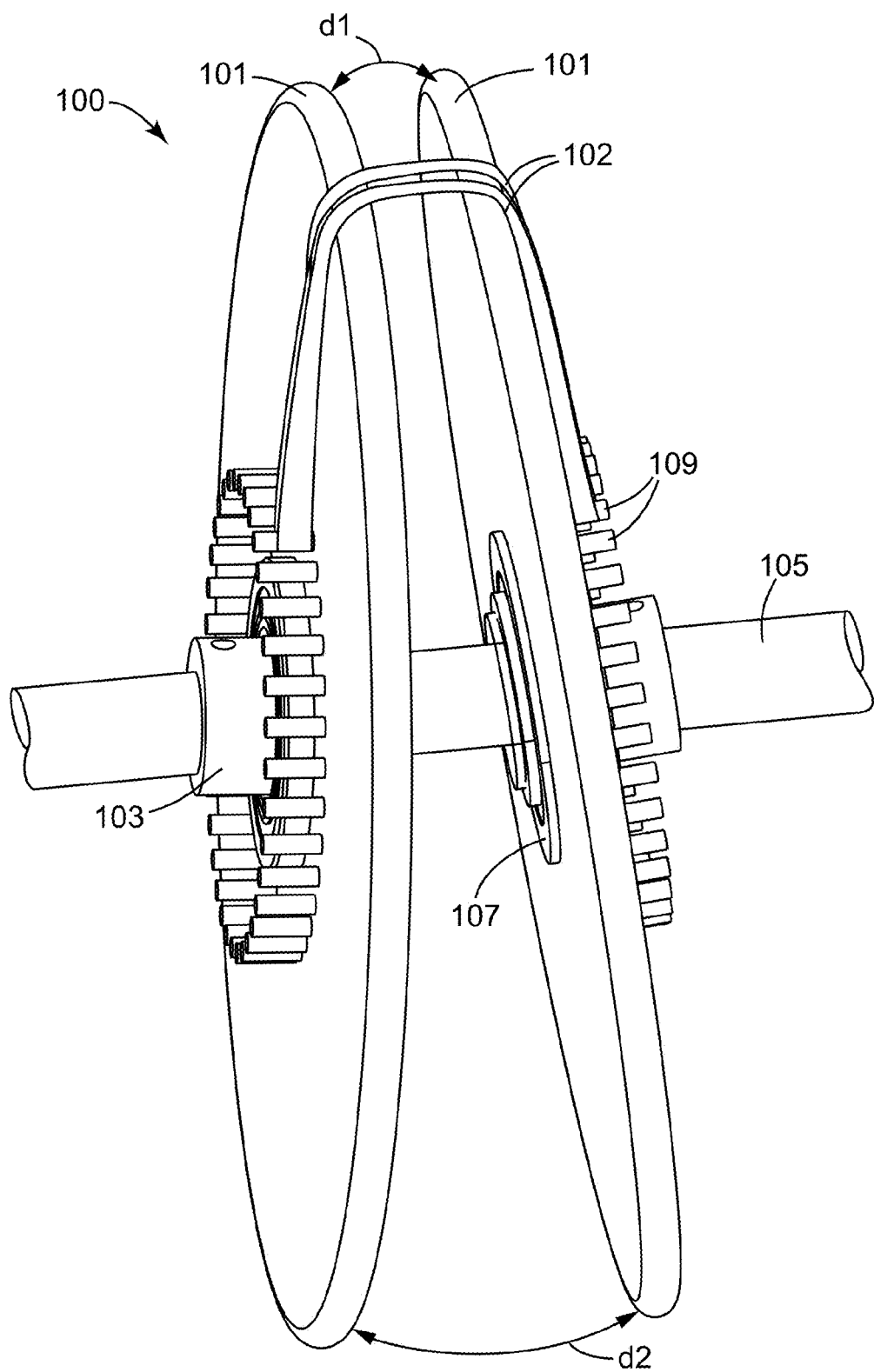
FIG. 1A is a perspective view of one embodiment of diverging disks having a stretchable surface useful for carrying out the method of the present disclosure.

Reference will now be made in detail to embodiments of the disclosure, one or more examples of which are illustrated in the drawings. Features illustrated or described as part of one embodiment can be used with other embodiments to yield still a third embodiment. It is intended that the present disclosure include these and other modifications and variations.

FIG. 1A illustrates an example of a roller 100 useful for practicing some embodiments of the method of the present disclosure. The roller includes two rotating diverging disks 101 that are laterally spaced. The angle of the diverging disks 101 is set with adapters 103 that are angled on non-rotating shaft 105. In other embodiments, the shaft itself may be angled so that the disks diverge. Bearings 107 allow rotation of the diverging disks 101 on the non-rotating shaft 105. In the illustrated embodiment, each of the diverging disks includes multiple pins 109 that are useful for attaching a stretchable surface to the diverging disks 101. The stretchable surface is provided by stretchable bands 102 that are wrapped around corresponding pins 109 on the two diverging disks 101. For example, a stretchable band 102 can be wrapped around a pair of pins 109 on each of the diverging disks 101 where the two pairs on the two disks are aligned with each other along the circumference of the disks. For visual clarity, only one circular stretchable band 102 is shown, which forms two separated stretchable surfaces. However, in operation, multiple bands 102 around the circumference of the diverging disks 101 may be useful to allow the continuous movement of the slit web.

In operation, band 102 stretches for 180 degrees of the rotation of the diverging disks 101 as it moves from the position where the disks are closest together (at d1) to the position where the disks are furthest apart (at d2). The band 102 then retracts for 180 degrees of the rotation of the diverging disks 101 as it moves from the position where the disks are furthest apart to the position where the disks are closest together. Multiple strands of a slit web or a polymeric netting (not shown in FIG. 1A) that come into contact with the band 102 at any position where the band is stretching will be spread apart in the direction of the stretch. The slit web or polymeric netting may be positioned to be in contact with the band 102 for any portion of the rotation sufficient to at least partially separate at least some of the multiple strands of the slit web or widen openings in the netting. In some embodiments, the slit web or polymeric netting may be in contact with the roller 100 for the entire 180 degrees during which the stretchable surface is stretching. However, in some embodiments, it is sufficient for the slit web or polymeric netting to remain in contact with the roller for any rotation in a range from 1 to 180 degrees, for example, up to 150, 120, 90, 60, 45, 30, 20, or 10 degrees of rotation, depending on the angle of the diverging disks 101 and the amount of spreading desired in the slit web or netting. In other embodiments, the slit web or polymeric netting may remain in contact with the roller for any rotation in a range from 1 to 360 degrees depending on the amount of spreading desired in the slit web or netting. The wrap angle can be adjusted depending on the amount of spreading desired in the process. In any of these embodiments, the portion of the rotation that the slit web or polymeric netting is in contact with the roller can be considered the path length.

Although bands 102 are useful as a stretchable surface on two rotating diverging disks 101 in the embodiment illustrated in FIG. 1A, other stretchable surfaces may also useful in conjunction with rotating diverging disks 101. For example, non-circular bands or tubing may provide the stretchable surface. A coiled spring may also provide the stretchable surface. In another example, a stretchable sleeve attached to the two diverging disks may be useful. Such a stretchable sleeve may be supported by a surface between the two diverging disks if desired, but this is not a requirement. An example of a tubular sleeve and clamps that may be adapted for use in the method according to the present disclosure is described in U.S. Pat. No. 4,862,565 (Damour). In this reference, a spreader roll with a resilient sleeve has been reported to be useful for removing wrinkles from fast traveling webs of fabric or plastic. Bands, tubing, coiled springs, or a sleeve may be attached to the diverging disks by clamps, belts, or any other of a variety of useful methods including the pins 109 illustrated in FIG. 1A.

Any stretchable material that is capable of stretching and retracting during the rotation of the diverging disks 101 may be useful for the stretchable surface 102 in the method according to the present disclosure. Such materials are elastic according to the definition provided above. In some embodiments, the stretchable surface is made from an elastomer. Examples of suitable classes of elastomers include natural polyisoprene, synthetic polyisoprene, polybutadiene, poly(2, 3-dimethylbutadiene), poly(butadiene-co-pentadiene), polysulfide elastomers, butyl rubber (e.g., polyisobutylene copolymers with isoprene), halogenated butyl rubber, polychloroprene, poly(butadiene-co-nitrile), hydrogenated nitrile-butadiene copolymers, and combinations thereof, any of which may be crosslinked by sulfur or non-sulfur vulcanization. Further useful elastomers include ethylene-propylene copolymers, ethylene-propylene-diene terpolymers, sulfonated ethylene-propylene-diene terpolymers, chlorosulfonated polyethylenes, silicone elastomers, acrylic elastomers, ethylene-acrylate copolymers, fluorinated elastomers, fluorochlorinated elastomers, fluorobrominated elastomers, and combinations thereof. Suitable elastomers also include thermoplastic elastomers, which are typically made up of blocks of glassy or crystalline blocks (e.g., polystyrene, poly(vinyltoluene), poly(t-butylstyrene), and polyester) and elastomeric blocks (e.g., polybutadiene, polyisoprene, ethylene-propylene copolymers, ethylene-butylene copolymers, polyether ester, and combinations thereof). Some thermoplastic elastomers are commercially available, for example, poly(styrene-butadiene-styrene) block copolymers marketed by Kraton Performance Polymers, Houston, Tex., under the trade designation "KRATON". The diverging disks themselves are typically made of metal (e.g., aluminum or steel) although other materials may be useful. Any of the embodiments of stretchable surfaces described above (e.g., bands, tubing, and sleeves) may be made of any of these materials.

Typically, elastomeric materials such as any of those described above are considered "high-friction" materials and may allow for sufficient traction between the slit web or polymeric netting and the stretching surface so that the slit web or netting spreads apart along with the stretching surface. The particular elastomer in the stretching surface may be selected to maximize the traction with the slit web or netting. However, in some embodiments, it may be useful to increase the traction between a given elastomer and slit web or netting. This may be carried out, for example, by increasing the machine direction tension on the web. Any surface over which a web is bent or wrapped around is believed to impart a force on the web that is normal or perpendicular to the web. Increasing the machine direction tension will increase such a force. Also, the stretching surface may be provided with surface structure to increase friction. For example, the presence of microstructures formed on the stretching surface can increase the coefficient of friction between the stretching surface and the slit web or netting. In embodiments in which the slit web is a mechanical fastening web, in particular in which the mechanical fastening elements are male fastening elements comprising upstanding posts having bases attached to the slit web, the upstanding posts can be directed to face against the stretching surface to increase traction.

As described above, the shaft 105 shown in FIG. 1A is a non-rotating shaft. In some embodiments, roller 100 is an idler roll, and the rotation of the diverging disks is not driven by any means other than the movement of the slit web. In other embodiments, the diverging disks may be driven by pulleys and belts or other suitable methods. In some embodiments, the rotation of the disks is driven from only one end of the shaft. For any of the embodiments in which the rotation of the diverging disks is driven, including embodiments in which the shafts are driven as described below, a clutch mechanism may be useful for adjusting the speed of rotation.

Figure 1B:
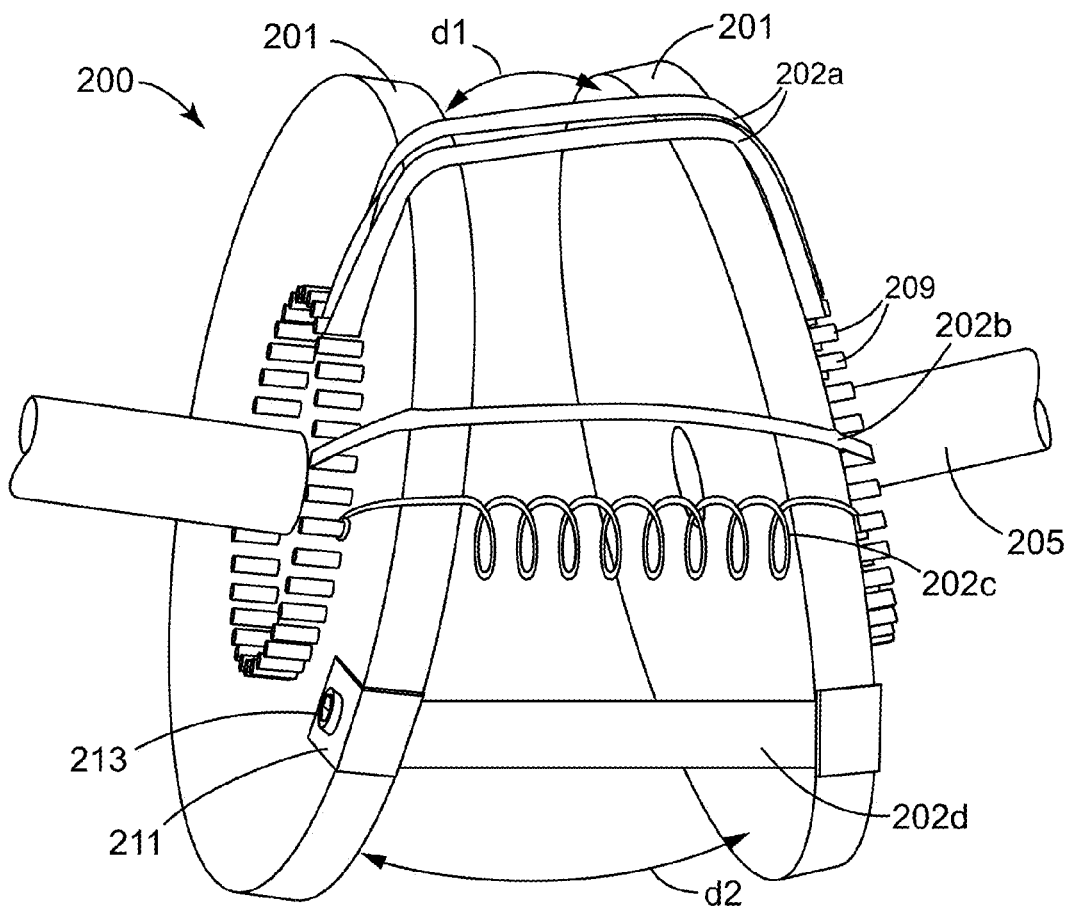
FIG. 1B is a perspective view of another embodiment of diverging disks having a stretchable surface useful for carrying out the method of the present disclosure.

Another embodiment of an apparatus including two diverging disks is illustrated in FIG. 1B. The apparatus includes two rotating diverging disks 201 that are laterally spaced and mounted on individual rotating shafts 205. The angle of the diverging disks 201 is adjusted by adjusting the angle of shafts 205. In FIG. 1B, like in FIG. 1A, each of the diverging disks includes multiple pins 209 that are useful for attaching a stretchable surface to the diverging disks 201. In the illustrated embodiment, each of the shafts is driven at a desired speed to cause rotation of the disks.

In FIG. 1B, a variety of stretchable surfaces are illustrated. Stretchable bands 202a that are wrapped around corresponding pins 209 on the two diverging disks 201 are like those shown in FIG. 1A. Hollow tubing 202b is also illustrated as a stretchable surface. The illustrated hollow tubing 202b has an inner diameter that allows it to be press fit on pins 209. Coiled spring 202c is also illustrated as a stretchable surface. The coiled spring may be metal (e.g., aluminum or steel) although other materials may be useful. The coiled spring may be coated with a high-friction coating, if desired. The high-friction coating can be, for example, a coating of an elastomeric material as described above, or a plasma coating known to provide a high-friction surface. Suitable plasma coatings include those available, for example, from Plasma Coating, Middlebury, Conn., under product family designations "10000" and "10015". The coiled spring may also be surrounded with a piece of hollow tubing, for example, made from any of the elastomeric materials described above. A stretchable band 202d that is held flat against the peripheral surfaces of the diverging disks 201 is also shown in FIG. 1B. In the illustrated embodiment, stretchable band 202d is held against the peripheral surfaces using clamps 211 that are attached to the diverging disks 201 with bolts 213, screws, or other means of attachment.

While any of the stretchable bands 202a or 202d, hollow tubing 202b, or coiled spring 202c may be the type of stretchable surface used individually in any of the embodiments of the method disclosed herein, it can also be useful to use different types of stretchable surfaces in combination. Accordingly, in some embodiments, the slit web or polymeric netting is run onto two different stretchable surfaces. In this embodiment, "different" can indicate that the stretchable surfaces are made from different materials or have a different configuration. Different types of stretchable surfaces may provide different advantageous properties, which may enhance different aspects of the method described herein. Different types of stretchable surfaces might be selected, for example, for their elongation, stiffness, or friction properties. For example, using a combination of stretchable bands 202a and hollow tubing 202b, one can take advantage of the higher coefficient of friction provided by the bands for efficient spreading of the slit web or netting and the higher modulus of the hollow tubing to prevent excessive deflection as the slit web or netting at least partially wraps around a diverging disk apparatus such as that shown in FIG. 1A or 1B. In embodiments in which the slit web or polymeric netting is run onto two different stretchable surfaces, the different types may both be provided in the same roller as shown in FIG. 1B. The slit web or polymeric netting would sequentially contact both of the stretchable surfaces during the 180 degrees of rotation in which the space between the diverging disks is increasing. The ability to select more than one material is more straightforward when the stretchable surface comprises bands, tubing, coiled springs, or a combination thereof than when the stretchable surface is a sleeve. Accordingly, in some embodiments in which the method is carried out on an apparatus including diverging disks, the stretchable surface is not a sleeve attached to the two diverging disks. Combinations of attachment methods of the stretchable surface to the diverging disks such as clamps and pins may also be useful.

As shown in FIGS. 1A and 1B, diverging disks 101 and 201 are positioned such that a portion of their peripheral surfaces have a closer spacing at one location d1 and a larger spacing at a second location d2. The angle, which may be set by adapters such as 103, by the position of shafts such as 205, by an angle in a shaft (not shown) or by a combination thereof, can be selected depending on the desired amount of spread in the slit web or netting. For example, each diverging disk 101, 201 may independently be angled at least 1, 2, 3, 4, or 5 degrees and up to 20, 15, or 10 degrees with respect to the machine direction of the running web. In some embodiments, each diverging disk is independently angled in a range from 1 to 10 degrees or 2.5 to 7.5 degrees. Since the diverging disks may be independently angled, the method according to the present disclosure may be useful for spreading the slit web or netting uniformly or non-uniformly with respect to the center of the slit web or netting. In some embodiments, the strands closer to one edge of the slit web or netting may be spread apart more than the strands closer to the opposite edge of the slit web or netting.

The difference between the spacing d2 and d1 is critical to the amount of spreading of the slit web or netting. This difference relates to the amount of spreading of the slit web or netting, and may equal the maximum amount of spreading assuming perfect traction between the stretching surface and the slit web or netting. In some embodiments, the spacing d2 is at least 25, 50, 60, 70, 80, 90, or 100 percent greater than the spacing d1. The percentage that the d2 spacing is greater than the d1 spacing can be determined, for example, by the formula $[(d2-d1)/d1]*100$. The closer the spacing of the diverging disks, the more spreading of the slit web or netting is allowed at a given angle of the diverging disks. Although other sizes may be useful, in some embodiments, d1 is at least 8 millimeters (mm) and up to 15.25 centimeters (cm), 12.7 cm, or 12.1 cm. Also, the larger the diverging disks, the more spreading of the slit web or netting is possible at a given angle. As described in greater detail below, the method according to the present disclosure is useful, in some embodiments, for spreading slit webs or nettings up to 10 cm in width, and it is possible to achieve an increase in width of at least 5, 15, 20, or 25 percent and up to 40, 50, 75, 100, 150, or 200 percent.

The increase in width of a slit web or netting that can be achieved in the method disclosed herein is typically much greater than an increase in the width of a web observed when removing wrinkles. A person having ordinary skill in the art would understand that removing wrinkles from a web typically only increases the width of the web by up to 2 percent. Therefore, it is unnecessary for a roller designed for removing wrinkles to have a spacing d2 that is at least 25, 50, 60, 70, 80, 90, or 100 percent greater than the spacing d1. Furthermore, removing wrinkles is typically only necessary for webs of at least 30 cm wide.

A variety of diameters of the disks may be useful for the method disclosed herein. To achieve higher line speeds or a greater amount of spreading, larger diameter disks having any of the angles or spacings described above may be useful. In some embodiments, the disks have a diameter of at least 10, 12, 14, or 16 cm.

While in some applications, it may be useful for the stretchable surface to be supported by a structure, for example, between the diverging disks that prevents or minimizes the inward deflection of the stretchable surface, such a support structure (e.g., a plurality of brushes) is not a requirement for the method disclosed herein. Accordingly, in some embodiments, the stretchable surface is not provided with a structure to support the stretchable surface opposite the side that contacts the slit web or netting. For example, the stretchable surface in these embodiments is not provided with a plurality of brushes that support the stretchable surface as it expands and retracts. In these embodiments, the stretchable surface is permitted to deflect inward as the slit web or netting contacts the stretchable surface. A certain amount of deflection will not hamper the spreading effect of the stretchable surface.

The method according to the present disclosure does not require the use of diverging disks. In some embodiments, the stretchable surface can be stretched in the second direction by a conveyor belt apparatus 300 such as that shown in FIG. 1C. Apparatus 300 includes a pair of diverging guides 311 for engaging and directing the side edges of the stretchable surface 302. The diverging guides 311 can be used in combination with gripping or vacuum belts or clamps on the edges (not shown) of the stretchable surface. The guides 311 in combination with the stretchable surface 302 form a continuous loop around a pair of pulleys 313. In these embodiments, the slit web or netting (not shown) can be brought into contact with the stretchable surface at narrower end 315. The multiple strands of the slit web or netting can then be spread apart as it remains in contact with the stretchable surface and is moved to the wider end 317 and thereby stretched. In the illustrated embodiment, multiple bands 302 attached separately to the guides 311 provide the stretchable surface although this is not a requirement. In other embodiments, the stretchable surface is provided by a continuous belt that alternatively stretches and retracts. Any of the stretchable surfaces and materials described above may be useful to provide stretchable surface 302. Also, the conveyor belt apparatus can include at least two different types of stretchable surfaces, as described above in connection with the diverging disks. In some embodiments, a pair of conveyor apparatuses 300 can be used together with the slit web or netting directed between them. The sandwich configuration may help the slit web or netting to remain in contact with the stretching surfaces.

Figure 1C:
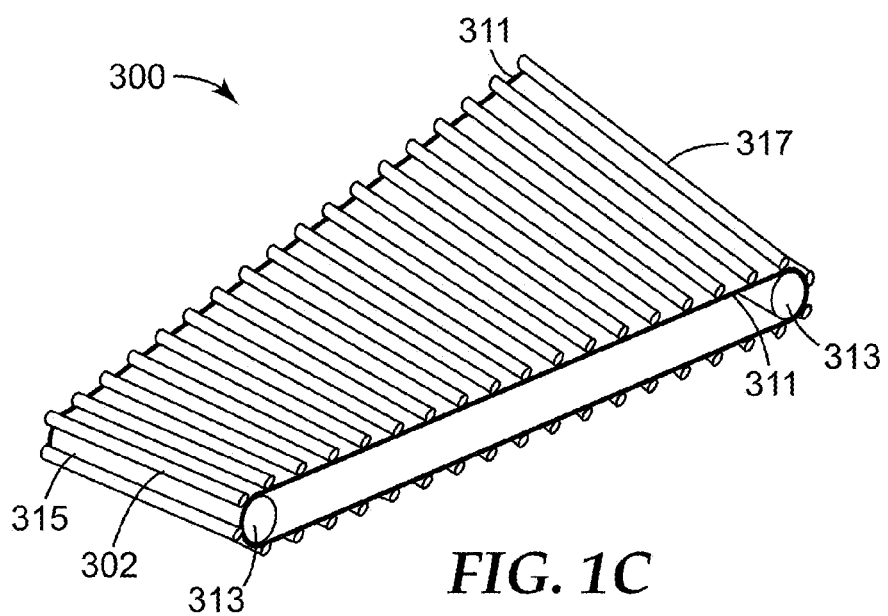
FIG. 1C is a perspective view of an embodiment of another apparatus having a stretchable surface useful for carrying out the method of the present disclosure.

In the embodiment shown in FIG. 1C, like in the embodiments that include diverging disks (e.g., those shown in FIGS. 1A and 1B), each guide 311 may independently be angled at least 1, 2, 3, 4, or 5 degrees and up to 20, 15, or 10 degrees with respect to the machine direction of the running web. In some embodiments, each guide 311 is independently angled in a range from 1 to 10 degrees or 2.5 to 7.5 degrees. Also, similar to the embodiments that include diverging disks, the stretchable surface 302 in FIG. 1C is not provided with a support structure to prevent the deflection of the stretchable surface when it contacts the slit web or netting. In some embodiments, the width of the apparatus at the wider end 317 is at least 25, 50, 60, 70, 80, 90, or 100 percent greater than the width of the apparatus at the narrower end 315. Similarly, for any apparatus useful for carrying out the present disclosure, the stretchable surface is stretched at least 25, 50, 60, 70, 80, 90, or 100 percent, for example, while it is in contact with the slit web or polymeric netting.

Slit webs and nets that can be separated or spread according to the methods disclosed herein typically develop little to no stress in the direction of stretching at least upon initially straining the slit web or netting the stretching direction. In some embodiments, the stretching direction is the second direction, transverse to the direction of the slits. In a slit web, the slits provide regions where any means for transmission of force in the second direction is substantially absent. In a netting, the openings in the netting or spaces between strands provide regions where any means for transmission of force in the stretching direction is substantially absent. Accordingly, in some embodiments, the material to be spread on the stretchable surface has a tensile modulus (i.e., the initial slope of the stress-strain curve) in the first direction of at least 2, 3, 5, 10, 20, 50, or 100 times the tensile modulus of the material in the second direction. The tensile modulus in the second direction can be affected by the size of the slits in a slit web, as described in further detail below.

In some embodiments, at least some of the multiple strands of the slit web are fully slit apart. In other words, these multiple strands are discrete strands, not attached to each other, that may be formed by slitting continuously through the web in the machine direction. In these embodiments, the slit web develops no stress in the second direction, which is transverse to the direction of the slits, upon separating the strands of the slit web. In embodiments in which the slit web comprises mechanical fastening elements on at least one major surface, for example male fastening elements having upstanding posts with bases attached to the slit web, spreading the slit web using the method according to the present disclosure can provide a fastening assembly in which discrete strands of the slit web are attached to an adhesive layer through their second major surfaces (i.e., opposite the first major surfaces having the upstanding posts) in a parallel fashion at a distance in the cross-direction from each other such that an alternating sequence of multiple parallel strips of exposed adhesive layer and of the mechanical fastening strands is obtained. Such an assembly is described in U.S. Pat. Appl. Pub. No. 2007/0039142 (Petersen et al.). Separated multiple strands of mechanical fastening elements may be useful in fastening tabs even when no exposed adhesive is present. See, e.g., Int. Pat. Appl. Pub. No. WO2011/163020 (Hauschildt et al.).

In other embodiments, portions of the multiple strands are attached to each other. Various embodiments of the slit web in which the multiple strands are attached to each other at intact bridging regions of web before and after they are spread are illustrated in FIGS. 2A through 2C, 3A, 3B, 4A, and 4B and described below.

Figure 2A:
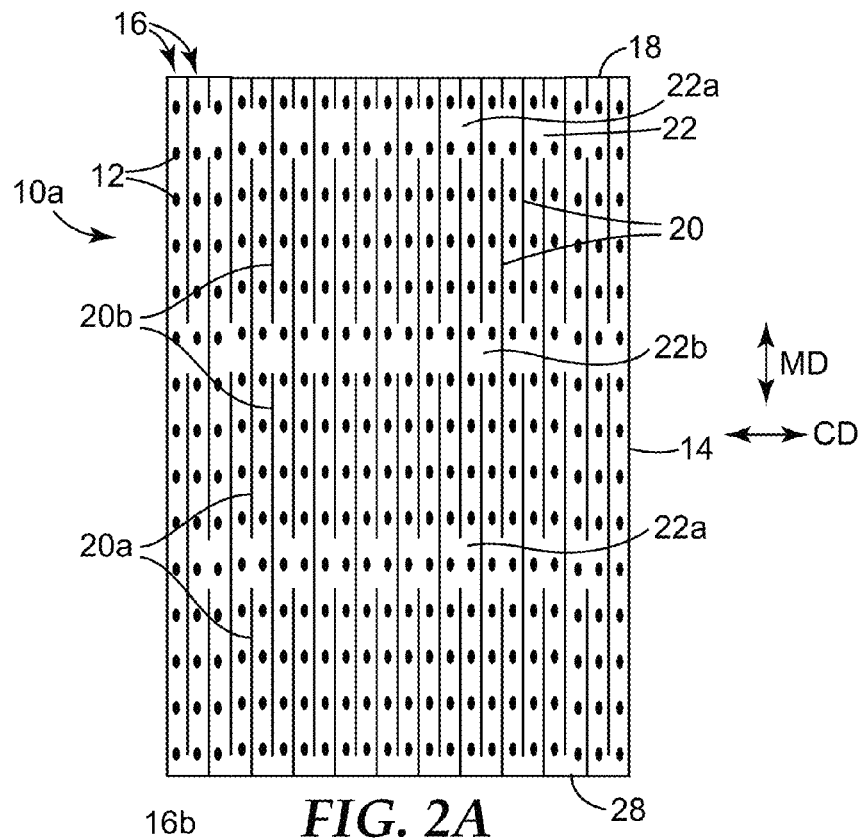
FIG. 2A is a top view of an embodiment of a portion of a slit web useful for the method of making a mechanical fastener disclosed herein.

FIG. 2A illustrates an example of a portion of a slit web 10a with interrupted slits 20 that is spread in some embodiments of the method disclosed herein. In the illustrated embodiment, the slit web 10a includes mechanical fastening elements, which are male fastening elements 12. Illustrated slit web 10a has a thermoplastic backing 14 with multiple rows 16 of male fastening elements 12 projecting from a first surface of the backing 14. The first surface of the backing is the surface that is visible in FIG. 2A. The first surface (that is, the surface with mechanical fastening elements) can also be called the first major surface in any of the embodiments disclosed herein. In the illustrated embodiment, the multiple rows 16 of male fastening elements 12 are aligned in the MD although this is not a requirement. The term "row" refers to male fastening elements lined up in a particular direction. The row or line of male fastening elements may be substantially straight.

In the portion of slit web 10a, interrupted slits 20 are cut into the backing between some pairs of adjacent rows 16 of male fastening elements 12. When an interrupted slit is cut between adjacent rows of male fastening elements 12, it typically means that the particular slit does not cross over a row of male fastening elements 12. The illustrated interrupted slits 20 are linear in the same direction as the multiple rows 16, which in the illustrated embodiment is the MD, and extend from the top edge 18 to the bottom edge 28 of the backing 14. The interrupted slits are interrupted by intact bridging regions 22 of the backing 14. The bridging regions 22 are regions where the web is not cut through, and at least a portion of the bridging regions 22 can be considered collinear with interrupted slit 20. The intact bridging regions 22 divide the interrupted slits into a series of spaced apart slit portions 20a. The spaced apart slit portions 20a and 20b and consequently bridging regions 22a and 22b of adjacent interrupted slits are staggered in a direction "CD" perpendicular to the direction "MD" of the interrupted slits 20. The bridging regions are staggered such that bridging region 22b is located substantially midway between bridging regions 22a in the direction "MD". However, in some embodiments, the upstanding posts 12, interrupted slits 20, and bridging regions 22, 22a, and 22b may be positioned in other arrangements. When the slit portions and bridging regions are staggered, the number of bridging regions necessary to make the slit mechanical fastener handle as an integral unit can be minimized.

The slits of the plurality of slits, which may be interrupted slits 20 as shown in FIG. 2A or complete slits, extend in a first direction that is non-parallel to the CD. In some embodiments of the method disclosed herein, the slits extend in the MD. When it is said that a slit "extends" in a certain direction, it is meant that the slit is arranged or aligned in that direction or at least predominantly in that direction. The slit may be linear. As used herein a "linear" slit can be defined by two points in a line on the web. The slit may also be substantially linear, which means that the slit can have a slight curvature or slight oscillation. Some oscillation or curvature may result, for example, from the process of slitting a continuous web as would be understood by a person skilled in the art. In some embodiments of mechanical fasteners with male fastening elements made according to the method of the present disclosure, any oscillation or curvature is such that the slit generally does not have a portion that crosses over a MD-aligned row of male fastening elements. The slits may also be non-linear. For example, they may have a wavy or sawtooth pattern with a small amplitude relative to the width of the web, and such a slit would also be considered to extend in predominantly in a certain direction.

Referring again to FIG. 2A, the particular arrangement of the bridging regions 22, 22a, and 22b can be designed, for example, based on the desired length of the slits and the amount of spreading desired for the multiple strands 26. Various lengths of bridging regions 22, 22a, and 22b may be useful. In some embodiments, any bridging regions 22 in a given interrupted slit 20 have a combined length in the direction of the interrupted slit of up to 50 (in some embodiments, 40, 30, 25, 20, 15, or 10) percent of the length of the slit web in the MD. In some embodiments, for maximizing the ability of the slit web 10a to spread, it may be desirable to minimize the combined length of the bridging regions in the direction of the interrupted slit. Minimizing the combined length of the bridging regions 22 in the direction of the interrupted slit may be accomplished by at least one of minimizing the length of any particular bridging region 22 or maximizing the distance between bridging regions 22. In some embodiments, the length of one bridging region in the direction of the interrupted slit is up to 3, 2, or 1.5 mm and at least 0.25, 0.5, or 0.75 mm. In some embodiments, the number of bridging regions along the length of the slit web 10a in the direction of the interrupted slit is up to 1.5, 1.25, 1.0, 0.75, 0.60, or 0.5 per cm. The distance between bridging regions 22 in the direction of the interrupted slit may be, for example, at least 0.75, 1.0, 1.25, 1.5, or 1.75 cm. Furthermore, the length of the interrupted slit portions between bridging regions can be adjusted and may be selected to maximize the distance between bridging regions. In some embodiments, the length of the slit portions 20a, 20b is at least 8 (in some embodiments, at least 10, 12, 14, 15, 16, 17, 18, 19, or 20) mm. In some embodiments, a ratio of a length of the slit portions to a width of one of the multiple strands is at least 2 to 1 (in some embodiments, at least 3:1, 5:1, 10:1, 12.5:1, or 15:1). In slit webs in which a ratio of a length of the slit portions to the width of the multiple strands is less than 2:1, the tensile stress developed in the second direction may become too high to allow the slit web to spread in the second direction on the stretching surface. Typically, the interrupted slits of the slit webs 10a useful for practicing some embodiments of the present disclosure have longer slit regions and shorter bridging regions than perforations that are designed to allow easy separation of two parts of a film.

In some embodiments, slit portions 20a, 20b have a regular pattern that repeats down the slit web 10a. In some embodiments, spacing (e.g., in the MD or other direction of the interrupted slits) between slit portions 20a may be uniform or substantially uniform (that is, the spacing may differ by up to 2 percent, 1 percent, or less than 1 or 0.5 percent) although this is not a requirement.

For any of the embodiments of the method disclosed herein, the number of slits (e.g., interrupted or complete slits) may be adjusted depending on the desired product. The slits may be evenly spaced or unevenly spaced as desired. In some embodiments, there are up to 10, 9, 8, 7, 6, 5, 4, 3, 2, or 1 slits per 10 mm across the width of the slit web in the CD. In some embodiments, changing the number of slits across the slit web may be related to the number of rows of male fastening elements between any two adjacent slits, depending on the density of the male fastening elements on the web. The number of rows of male fastening elements between any two adjacent slits may be adjusted depending on the requirements of the application. In some embodiments, there are up to 10, 9, 8, 7, 6, 5, 4, 3, 2 rows, or 1 row of male fastening elements between any two adjacent slits. Typically, the width dimension of each of the multiple strands formed between slits is wider than at least the bases of the upstanding posts of the male fastening elements. In some embodiments, there is a slit between every row or every other row of male fastening elements. In the embodiment illustrated in FIG. 2A, the interrupted slits 20 are evenly spaced among the rows of male fastening elements 12 although this is not a requirement. For multiple rows 16 of male fastening elements 12 that are evenly spaced, as illustrated, the spacing (e.g., distance in the CD in the illustrated embodiment) between multiple rows 16 may differ by up to 10, 5, 2.5, or 1 percent. Likewise, for slits that are evenly spaced, the spacing (e.g., distance in the CD) between the slits may differ by up to 10, 5, 2.5, or 1 percent.

Figure 2B:
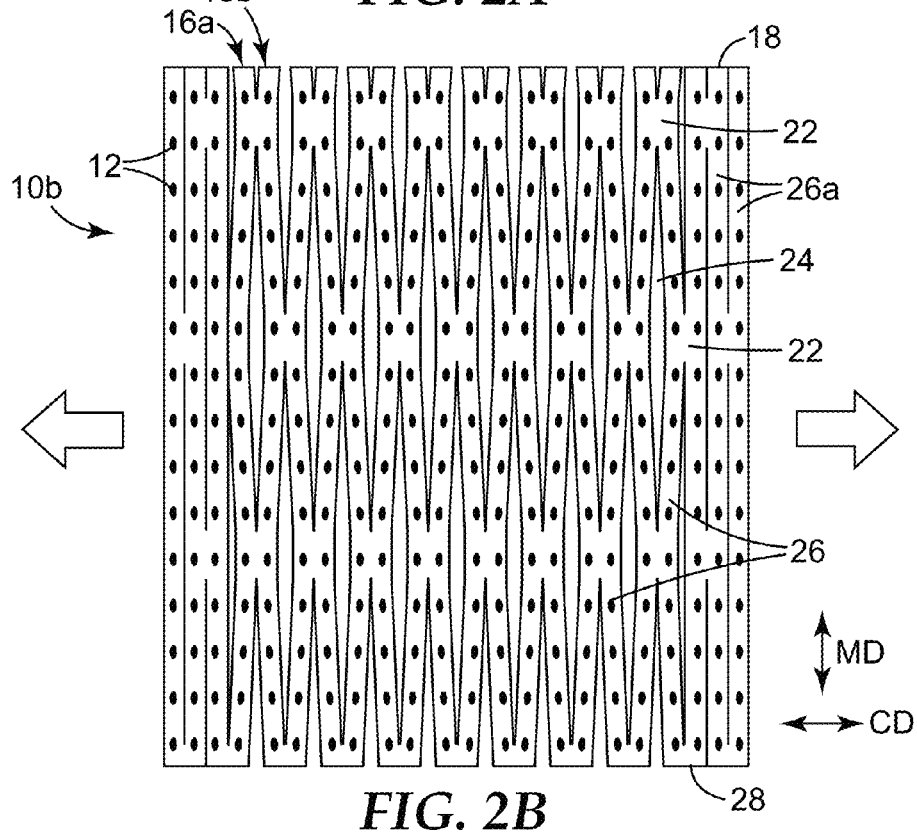
FIG. 2B is a top view of the portion of the slit web shown in FIG. 2A after it is spread according to the method disclosed herein.
Figure 2C:
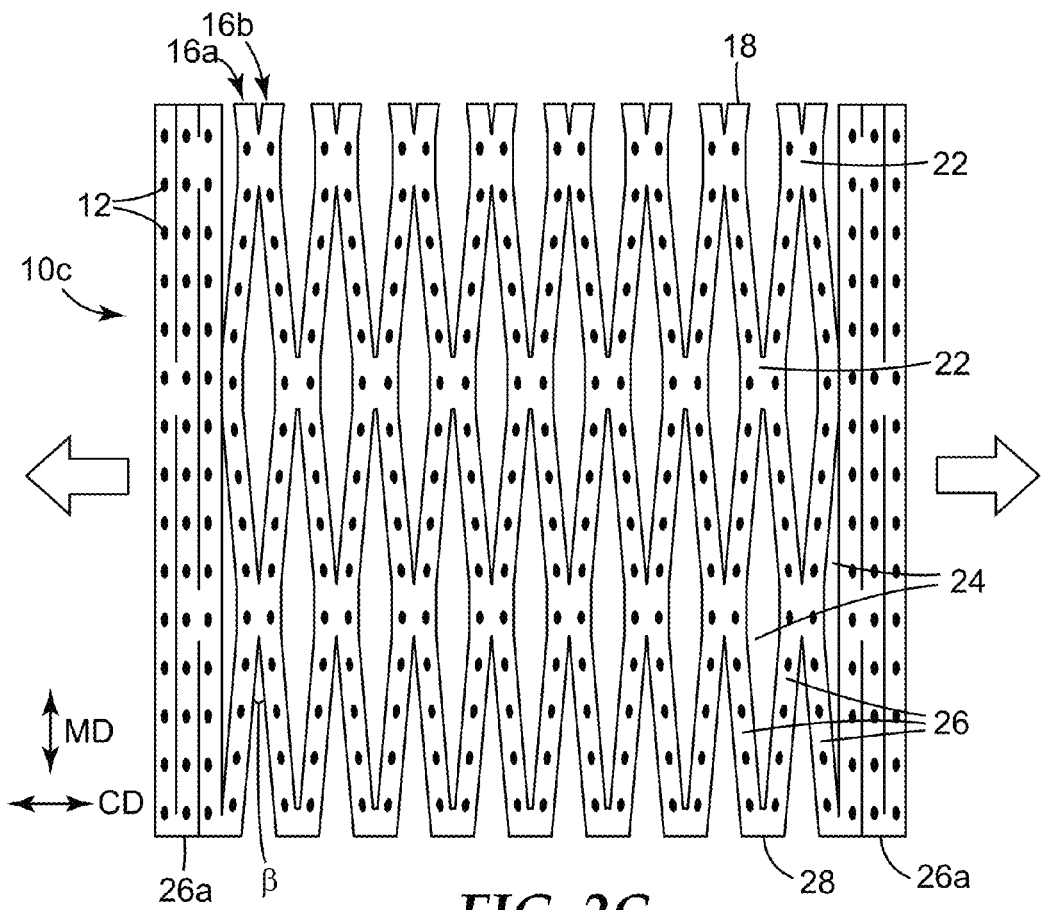
FIG. 2C is a top view of the portion of the slit web of FIG. 2B after it is spread to a greater extent than shown in FIG. 2B.

FIGS. 2B and 2C illustrate the effect of spreading the slit web like that shown in FIG. 2A to different extents. When the slit web 10b is spread in the second direction, shown with the arrows, multiple strands 26 of the web are provided, which are attached to each other at least at some of the intact bridging regions and separated from each other between at least some of the intact bridging regions. In the illustrated embodiment, the separation between at least some of the multiple strands creates openings 24. The method according to the present disclosure typically increases the width of the slit web (that is, the dimension in the CD).

FIG. 2C illustrates a greater amount of spreading than FIG. 2B. As described above in conjunction with FIG. 1A, the amount of spreading provided in the method disclosed herein can be controlled by a variety of factors including the angle of the diverging disks relative to the axis of the non-rotating shaft, and distance d2 relative to distance d1. In some embodiments, spreading the slit web is carried out by feeding the slit web onto a stretchable surface multiple times in a series, which can also affect the extent of spreading. In some embodiments, the width of the spread web is at least 5, 10, 15, 20, or 25 percent greater than the width of the input slit web, which may include interrupted or complete slits. In some embodiments, the width of the spread web is up to 40, 50, 75, 100, 150, or 200 percent greater than the width of the input slit web. In embodiments in which the multiple strands are not attached, the width of the spread web is the distance between the outside edges of the outermost strands.

In the embodiment illustrated in FIG. 2C, at least two strands 26a, including at least two rows of male fastening elements on each edge of the mechanical fastener, are not separated. A spread mechanical fastening web having strands on the edge that are not spread apart may be advantageous in some embodiments, for example, to provide a reticulated mechanical fastening strip or patch with a straight edge.

While FIGS. 2A through 2C illustrate a backing 14 with male fastening elements 12 that comprise upstanding posts, it should be understood that other types of webs can be slit to provide slit web 10a and spread using the method disclosed herein in the same manner to the same extent as spread mechanical fastening webs 10b and 10c. In some embodiments, the slit web can be a web of loop material or another fibrous web. In some embodiments, the slit web can be a thermoplastic film without surface structures. The slit web may also be a foamed film. In some embodiments, the slit web is a multilayered film, for example, having a thermoplastic film layer and at least one of a fibrous layer or a foamed layer.

Figure 3A:
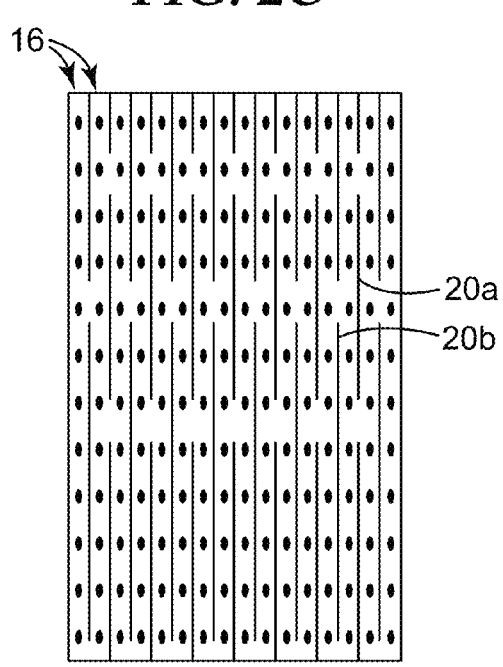
FIG. 3A is a top view of another embodiment of a portion of a slit web useful for the methods of making a mechanical fastener disclosed herein.

FIG. 3A illustrates an example of a slit web portion with interrupted slits 20 and having male fastening elements, which is similar to the portion of slit web 10a shown in FIG. 2A. However, in the embodiment shown in FIG. 3A, slit portions 20a have different lengths than slit portions 20b of adjacent slits, which results in openings 24a and 24b having different sizes after the slit web is spread as shown in FIG. 3B.

That is, openings 24a are shorter in the MD than openings 24b. The slit portions of the smaller size 20a and slit portions of the larger size 20b each may be aligned with each other across the slit web as shown in FIG. 3A. Or in other embodiments, slits of the same size may be offset relative to each other in a regular pattern. Furthermore, referring again to FIG. 2A, the length of the bridging regions 22 may be made to vary within a strand 26 or between strands 26 as desired for a particular application or appearance. Although FIGS. 3A and 3B illustrate mechanical fasteners with male fastening elements, the same slitting pattern and spreading using the method disclosed herein can be carried out with other types of webs (e.g., films, foams, fibrous webs, loop materials, and multilayered constructions as described above).

FIG. 4A illustrates an example of a slit web with interrupted slits, which is similar to the slit web 10a shown in FIG. 2A. However, in the embodiment shown in FIG. 4A, slit portions 20e have different lengths than slit portions 20f, which results in openings 24c and 24d having different sizes after the slit web is spread as shown in FIG. 4B. In contrast to the embodiment shown in FIGS. 3A and 3B, which illustrates interrupted slits with slit portions of different lengths in the MD and the corresponding resulting openings, FIGS. 4A and 4B illustrate patterns of slit portions of different lengths in different zones in the CD of the slit web. The multiple strands 26c and 26d have a different appearance from each other in the same spread web, for example, multiple strands 26c and 26d zig-zag or undulate with a different wavelength and amplitude. The slit web and the slit-and-spread web shown in FIGS. 4A and 4B, respectively, may or may not include male or female mechanical fastening elements (not shown). Or the slit web and the slit-and-spread web shown in FIGS. 4A and 4B, respectively, may be an unstructured film, a fibrous web, a foamed material, or a multilayered material.

For any of the embodiments of the method of spreading a slit web having interrupted slits disclosed herein, the openings formed by the separation of the multiple strands between at least some of the bridging regions are in the form of a repeating pattern of geometric shapes. In the illustrated embodiments, the geometric shapes are polygons, which may be quadrilaterals such as rhombuses. In some embodiments of the spread web, including the embodiment illustrated in FIG. 2C, the multiple strands of the web attached to each other at least at some of the intact bridging regions form an angle β of less than 90 degrees, in some embodiments, less than 60 degrees, 45 degrees, or 20 degrees, and in some embodiments, in a range from 0.5 to 20 degrees. For example, in some embodiments, when a slit web having 19 mm slit portions 20a is spread so that the width of the spread mechanical fastening web is 100% greater than the input slit web, the angle β is typically in a range from about 5 to 10 degrees. In some embodiments, curved lines may be used, which can result in crescent shaped openings after spreading. As shown in FIG. 4B, there may be more than one repeating pattern of geometric shaped openings. The openings may be evenly spaced or unevenly spaced as desired. For openings that are evenly spaced, the spacing (e.g., distance in the CD) between the openings may differ by up to 10, 5, 2.5, or 1 percent.

Although the methods of spreading a web illustrated in FIGS. 2A through 2C, 3A and 3B, and 4A and 4B each show interrupted slits extending parallel to the MD of the slit web, slits (e.g., interrupted or complete slits) may be made in any desired direction not parallel to the CD. For example, slits may be made at an angle from 1 to 85 degrees to the MD of the slit web. In some embodiments, slits are made at an angle in a range from 35 to 55 degrees (e.g., 45 degrees) to the MD of the slit web.

The method according to the present disclosure may be useful for any width of the slit web in the CD. For example, the slit web may have a width in the CD in a range from 5 mm to 10 cm, 1 cm to 5 cm, or 1 cm to 3 cm wide. Also, the stretchable surface using for any of the embodiments of the method described herein may have an initial width before stretching in a range from 8 mm to 15.25 cm, 1 cm to 15.25 cm, 1 cm to 12.7 cm, 8 mm to 12.1 cm, or 1 cm to 10 cm wide although other widths may be useful.

The method of the present disclosure may be useful not only for separating the strands of a slit web on a stretchable surface as described above in connection with FIGS. 2A, 2B, 2C, 3A, 3B, 4A, and 4B but also for increasing the width of a polymeric netting. The method of increasing a width of a polymeric netting includes providing a polymeric netting having a length in a machine direction and running the polymeric netting in the machine direction onto a stretchable surface, wherein the polymeric netting is in contact with the stretchable surface for a path length in the machine direction, wherein for at least a portion of the path length, the stretchable surface is stretching in the cross-machine direction, and wherein traction between the polymeric netting and the stretchable surface during stretching increases the width of at least a portion of the polymeric netting in the cross-machine direction. In some embodiments, the polymeric netting is formed after at least some of the multiple strands of the slit web described above in any of its embodiments are at least partially separated. In these embodiments, the method of increasing a width of a polymeric netting may be understood as a method of separating strands of a slit web further comprising running the slit web in the machine direction a second time onto a second stretchable surface, wherein at least a portion of at least some of the multiple strands of the slit web are further separated on the second stretchable surface. In some of these embodiments (e.g., any of the embodiments described above in which the stretchable surface connected to two diverging disks), the method of increasing a width of a polymeric netting may be understood as a method of separating strands of a slit web with bridging regions further comprising running the slit over a second roller comprising two rotating diverging disks that are laterally spaced and have a stretchable surface between them that stretches in the cross-machine direction for a portion of a rotation of the two rotating diverging disks, wherein at least a portion of at least some of the multiple strands of the slit web are further separated on the second roller. However, in the method of increasing a width of a polymeric netting, the netting need not be formed from a slit web. The polymeric netting may be any netting in which any tensile stress that develops in the cross-direction is low enough to allow the widening of the openings of the netting when it is in contact with the stretchable surface. Although many polymeric nettings may be widened using this method, in some embodiments, the netting comprises an array of polymeric strands periodically joined together at bond regions throughout the array, but the polymeric strands do not substantially cross over each other. In some embodiments of these nettings at least 50 (at least 55, 60, 65, 70, 75, 80, 85, 90, 95, 99, or even 100) percent by number of the polymeric strands do not cross over each other. In some embodiments of these nettings, the netting has a thickness up to 750 micrometers (in some embodiments, up to 500 micrometers, 250 micrometers, 100 micrometers, 75 micrometers, 50 micrometers, or even up to 25 micrometers; in a range from 10 micrometers to 750 micrometers, 10 micrometers to 750 micrometers, 10 micrometers to 500 micrometers, 10 micrometers to 250 micrometers, 10 micrometers to 100 micrometers, 10 micrometers to 75 micrometers, 10 micrometers to 50 micrometers, or even 10 micrometers to 25 micrometers). In some embodiments of these nettings, at least some of the polymeric strands have a core including a first polymeric composition and a sheath comprising a second, different polymeric composition. Examples of useful netting are described in Int. Pat. Appl. Pub. Nos. WO 2013/028654 (Ausen et al.) and WO 2013/032683 (Ausen et al.), the disclosures of which are incorporated herein by reference in their entirety. Nettings that may be widened according to the method disclosed herein may be useful, for example, in wound care applications, surgical drapes, and absorbent articles. In some of these embodiments, at least a portion of the netting is made from an elastic polymeric composition. Polymeric nettings that include mechanical fastening elements, such as those described in co-pending U.S. patent application Ser. No. 13/587,655, filed Aug. 16, 2012, and incorporated by reference in its entirety herein, may also be suitable for processing with the method disclosed herein.

In some embodiments, the slit web useful in the method disclosed herein or the resulting spread web is made of a thermoplastic material. Suitable thermoplastic materials include polyolefin homopolymers such as polyethylene and polypropylene, copolymers of ethylene, propylene and/or butylene; copolymers containing ethylene such as ethylene vinyl acetate and ethylene acrylic acid; polyesters such as poly(ethylene terephthalate), polyethylene butyrate and polyethylene napthalate; polyamides such as poly(hexamethylene adipamide); polyurethanes; polycarbonates; poly(vinyl alcohol); ketones such as polyetheretherketone; polyphenylene sulfide; and mixtures thereof. Typically, in embodiments in which the slit web includes male fastening elements, the thermoplastic is a polyolefin (e.g., polyethylene, polypropylene, polybutylene, ethylene copolymers, propylene copolymers, butylene copolymers, and copolymers and blends of these materials).

In the embodiments of the slit web useful in the method disclosed herein or the resulting spread web that includes male fastening elements, the backing and the male fastening elements are typically integral (that is, formed at the same time as a unit, unitary). Upstanding posts on a backing can be made, for example, by feeding a thermoplastic material onto a continuously moving mold surface with cavities having the inverse shape of the posts. The thermoplastic material can be passed between a nip formed by two rolls or a nip between a die face and roll surface, with at least one of the rolls having the cavities. The cavities may be in the inverse shape of a capped post having a loop-engaging head or may be in the inverse shape of an upstanding post without loop-engaging heads (e.g., a precursor to a male fastening element). Pressure provided by the nip forces the resin into the cavities. In some embodiments, a vacuum can be used to evacuate the cavities for easier filling of the cavities. The nip typically has a large enough gap such that a coherent backing is formed over the cavities. The mold surface and cavities can optionally be air or water cooled before stripping the integrally formed backing and upstanding hook elements from the mold surface such as by a stripper roll. If the posts formed upon exiting the cavities do not have loop-engaging heads, loop-engaging heads could be subsequently formed into hooks by a capping method as described in U.S. Pat. No. 5,077,870 (Melbye et al.). Typically, the capping method includes deforming the tip portions of the hook elements using heat and/or pressure. The heat and pressure, if both are used, could be applied sequentially or simultaneously.

Suitable tool rolls include those formed from a series of plates defining a plurality of post-forming cavities about its periphery such as those described, for example, in U.S. Pat. No. 4,775,310 (Fischer). Cavities may be formed in the plates by drilling or photoresist technology, for example. Other suitable tool rolls may include wire-wrapped rolls, which are disclosed along with their method of manufacturing, for example, in U.S. Pat. No. 6,190,594 (Gorman et al.). Another example of a method for forming a thermoplastic backing with upstanding posts includes using a flexible mold belt defining an array of upstanding post-shaped cavities as described in U.S. Pat. No. 7,214,334 (Jens et al.). Yet other useful methods for forming a thermoplastic backing with upstanding posts can be found in U.S. Pat. No. 6,287,665 (Hammer), U.S. Pat. No. 7,198,743 (Tuma), and U.S. Pat. No. 6,627,133 (Tuma).

The male fastening elements in the slit web or spread mechanical fastening web disclosed herein may have loop-engaging heads that have an overhang or may be upstanding posts having distal tips that can be formed into loop-engaging heads, if desired. The term "loop-engaging" as used herein relates to the ability of a male fastening element to be mechanically attached to a loop material. Generally, male fastening elements with loop-engaging heads have a head shape that is different from the shape of the post. For example, the male fastening element may be in the shape of a mushroom (e.g., with a circular or oval head enlarged with respect to the stem), a hook, a palm-tree, a nail, a T, or a J. The loop-engageability of male fastening elements may be determined and defined by using standard woven, nonwoven, or knit materials. A region of male fastening elements with loop-engaging heads generally will provide, in combination with a loop material, at least one of a higher peel strength, higher dynamic shear strength, or higher dynamic friction than a region of posts without loop-engaging heads. Male fastening elements that have "loop-engaging overhangs" or "loop-engaging heads" do not include ribs that are precursors to fastening elements (e.g., elongate ribs that are profile extruded and subsequently cut to form male fastening elements upon stretching in the direction of the ribs). Such ribs would not be able to engage loops before they are cut and stretched. Such ribs would also not be considered upstanding posts. Typically, male fastening elements that have loop-engaging heads have a maximum thickness dimension (in either dimension normal to the height) of up to about 1 (in some embodiments, 0.9, 0.8, 0.7, 0.6, 0.5, or 0.45) millimeter. In some embodiments, the male fastening elements have a maximum height (above the backing) of up to 3 mm, 1.5 mm, 1 mm, or 0.5 mm and, in some embodiments a minimum height of at least 0.05 mm, 0.1 mm, or 0.2 mm. In some embodiments, the upstanding posts have aspect ratio (that is, a ratio of height to width at the widest point) of at least about 2:1, 3:1, or 4:1.

In some embodiments of a slit web having male fastening elements useful for practicing the present disclosure, at least a portion of each loop-engaging overhang (e.g., at the cap or head) extends at a nonzero angle to the direction of the slits. In some embodiments, each male fastening element has a cap with loop engaging overhangs extending in multiple (i.e., at least two) directions. For example, the upstanding post may be in the shape of a mushroom, a nail, a palm tree, or a T. In some embodiments, the upstanding posts are provided with a mushroom head (e.g., with an oval or round cap distal from the thermoplastic backing). In other embodiments, loop-engaging overhangs (e.g., at the cap or head) on the upstanding posts of the slit web extend parallel to the MD. For example, the upstanding posts may have the shape of a J (e.g., as shown in U.S. Pat. No. 5,953,797 (Provost et al.).

In spread mechanical fastening web 10b and 10c illustrated in FIGS. 2B and 2C, the male fastening elements 12 on a first strand 26 are arranged in a series 16a that is non-parallel to a series 16b of male fastening elements 12 on a second, adjacent strand 26. The series 16a and 16b of multiple upstanding posts and the multiple strands themselves from which they project can undulate or zig-zag along the length of the spread mechanical fastening web 10b or 10c, for example, from the top edge 18 to the bottom edge 28. In the illustrated embodiment, the caps visible on the upstanding posts of the male fastening elements 12 have an oval shape, and these caps are oriented in different directions along the multiple strands 26 in the MD. When the caps are circular in shape, it may not be observed that the caps are oriented in different directions along the multiple strands 26, unless the cap is marked in some way. In the illustrated embodiment, the caps on a first strand 26 are oriented in a different direction than the caps on a second, adjacent strand 26. In embodiments in which slit web 10a includes male fastening elements having loop-engaging overhangs aligned only parallel to the MD, spreading the slit web 10a typically results in the loop-engaging overhangs oriented in different directions along the multiple strands in the MD as shown in FIG. 2C. When loop-engaging overhangs are oriented in multiple directions (e.g., not only one direction such as the machine direction), enhanced engagement of a loop material may advantageously result.

Loop materials useful for practicing some embodiments of the present disclosure (e.g., when the web is a loop material) can be any suitable material that interlocks with corresponding hook fastening elements. In some embodiments, the loop fastening elements are typically formed from knitted fabrics, woven fabrics, or non-woven fabrics. The term "non-woven" refers to a material having a structure of individual fibers or threads that are interlaid but not in an identifiable manner such as in a knitted fabric. Examples of non-woven webs include spunbond webs, spunlaced webs, airlaid webs, meltblown web, and bonded carded webs. The spread web prepared by the method disclosed herein may include fiber loops projecting from a knitted, woven, or non-woven backing or may be extrusion-bonded, adhesive-bonded, and/or sonically-bonded fiber loops. Useful loop materials may be made of natural fibers (e.g., wood or cotton fibers), synthetic fibers (e.g., thermoplastic fibers), or a combination of natural and synthetic fibers. Examples of suitable materials for forming thermoplastic fibers include polyolefins (e.g., polyethylene, polypropylene, polybutylene, ethylene copolymers, propylene copolymers, butylene copolymers, and copolymers and blends of these polymers), polyesters, and polyamides. The fibers may also be multi-component fibers, for example, having a core of one thermoplastic material and a sheath of another thermoplastic material.

In some embodiments, the web of loop material that can be spread according to the method disclosed herein comprises a fibrous layer disposed on a backing. Suitable backings include textiles, paper, thermoplastic films (e.g., single- or multilayered films, coextruded films, laterally laminated films, or films comprising foam layers), and combinations thereof. For thermoplastic backings, the thermoplastic can be any of those described above in connection with a thermoplastic backing having male fastening elements. Examples of suitable loop materials are described, for example, in U.S. Pat. No. 5,256,231 (Gorman et al.) and U.S. Pat. No. 5,389,416 (Mody et al.). As described in U.S. Pat. No. 5,256,231 (Gorman et al.), the fibrous layer in a loop material according to some embodiments can comprise arcuate portions projecting in the same direction from spaced anchor portions on the backing.

The method according to the present disclosure can be useful with slit webs or nets having a variety of thicknesses. In some embodiments, the thickness of the slit web that may be spread according to the method described herein may be up to about 400, 250, 150, 100, 75 or 50 micrometers, depending on the desired application, which does not necessarily include the height of male or female mechanical fastening elements on the surface of the web. In some embodiments, the thickness of the web is in a range from 30 to about 225 micrometers, from about 50 to about 200 micrometers, or from about 100 to about 150 micrometers. In some embodiments wherein the web is thermoplastic, the thermoplastic web has stretch-induced molecular orientation, for example, when the thermoplastic web is stretched after formation of upstanding posts. In other embodiments, the thermoplastic web is not provided with macroscopic stretch-induced molecular orientation in the direction of the slits or in the direction of spreading. In embodiments in which the multiple strands of the spread web are attached to each other at intact bridging regions and separated from each other between the intact bridging regions, there may be some stress-induced orientation localized in the bridging regions.

Figure 5:
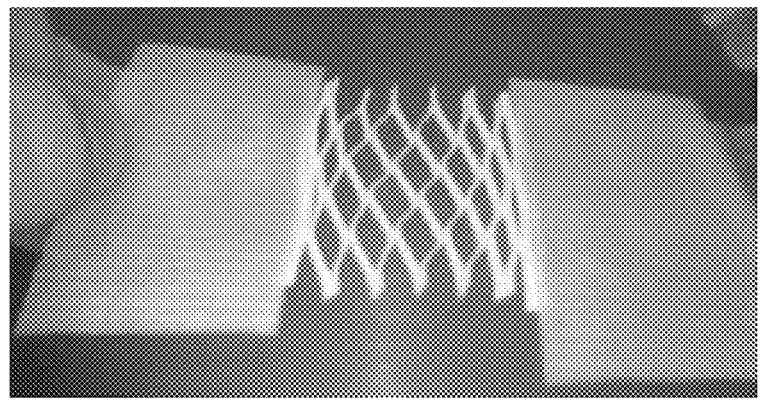
FIG. 5 is a photograph illustrating twisting of strands of a slit web portion when it is spread apart.

When separating strands of a web including interrupted slits, the method of the present disclosure can typically spread a slit web while advantageously not allowing all of the attached multiple strands of the spread web to twist out-of-plane. Twisting out-of-plane can result when spreading a slit web as shown in the photograph of FIG. 5. Pieces of loop material were attached to the edges of a slit mechanical fastener web portion with male fastening elements such as that shown in FIG. 2A. When the pieces of loop material were pulled apart, the attached strands of the slit web tended to twist out of the plane of the web as shown in FIG. 5. The amount of out-of-plane twisting is typically affected, for example, by the extent to which the slit web is spread. Twisted strands of the spread web create a non-uniform contact surface, which can complicate heat transfer to the web and complicate the use of a nip in further web processing (e.g., annealing or laminating as described below) since the twisted strands may be crushed by the nip.

A number of features of the method according to the present disclosure can help control the tendency of the attached strands of the slit web to twist out-of-plane. The traction between the slit web and the stretchable surface can help to keep the attached strands from twisting out of plane. The tension applied in the machine direction that causes the roller shown in FIG. 1A to exert a force on the slit web normal to the slit web can also help to keep the attached strands in plane. In this way, the method disclosed herein may be considered to maintain or constrain at least some of the multiple strands in an arrangement substantially coplanar with the plane of the web, for example, as the web leaves the stretchable surface. A substantially "coplanar" arrangement refers to the strands occupying substantially the same plane. The term "substantially" in this regard can mean that at least some of the multiple strands can be twisted out of plane by up to 15, 10, or 5 degrees. The phrase "at least some" with regard to the multiple strands being constrained refers to at least 25, 50, 75, or 90 percent or more of the multiple strands being constrained.

A number of web handling or web processing techniques may be useful in a variety of combinations for some embodiments of the method disclosed herein. For any of the aforementioned embodiments of the method according to the present disclosure, providing a slit web can be carried out in a variety of ways. For example, rotary die cutting of a continuous web may be useful. Interrupted slits can be made, for example, by using rotary cutting blades having gaps to form the bridging regions. The height of the blade in the gaps may be adjusted to allow for the bridging regions to be partially cut or not cut at all, depending on the desired embodiment. Other cutting methods (e.g., laser cutting) may also be useful. For embodiments in which the web includes mechanical fastening elements on at least one surface, cutting can be performed from either surface of the continuous web. A slit may be cut "through" the web, which means that the slit cuts through the entire thickness of the web. In other embodiments, the slit may be a partial-depth slit as long as the stretching surface can pull apart the partial depth slit. The partial-depth slit may penetrate, for example, 80, 85, or 90 percent of the thickness of the web or more, which means the solution to the equation:

(depth of the slit divided by the thickness of the web)× 100 is at least 80, 85, or 90 in some embodiments. Other methods of slitting a web can be found, for example, in U.S. Pat. Appl. Pub. No. 2011/0313389 (Wood et al.).

When the slitting step comes immediately before feeding the slit web onto a stretching surface, the web can be guided before it is slit, which may be easier than guiding the slit web. This can be advantageous both in embodiments in which the slit web is fully slit and in embodiments in which the multiple strands are joined at bridging regions. In some embodiments, when male fastening elements are formed as described above, for example, where a thermoplastic material is fed onto a continuously moving mold surface with cavities having the inverse shape of upstanding posts, slitting the web and spreading the slit web according to the method disclosed herein can be carried out before or after a capping step is carried out to form loop-engaging heads. Also, deforming the distal tip to form a cap can be carried out, for example, after slitting through the web but before spreading the slit web; after spreading the slit web but before annealing (described below); or after annealing as desired. The formation of male fastening elements can also include a step in which the shape of the cap is changed, for example, as described in U.S. Pat. No. 6,132,660 (Kampfer). Such a cap modifying step can be carried out directly after capping or after any of the slitting, spreading, or further processing steps described herein.

In some embodiments, the method according to the present disclosure further comprises heating the spread web. In some embodiments, in particular in embodiments in which the multiple strands are attached at intact bridging regions, the method according to the present disclosure further comprises annealing the spread web. In some embodiments, annealing comprises heating the spread web. In some embodiments, annealing comprises heating and then cooling (e.g., rapidly cooling) the spread web to maintain its configuration. Heating and/or annealing can be carried out, for example, after the spread web has been spread to the final desired extent or at an intermediate stage, for example, if the spread web is spread a second time with a second stretchable surface. Annealing the spread web can be useful, for example, depending on the extent of spreading, and can be useful to maintain the openings between multiple strands, for example, when the width of the slit web has been increased by at least 50 percent. Annealing can also be useful, for example, for maintaining at least some of the multiple strands in a substantially coplanar arrangement. In some embodiments, including embodiments in which the web includes mechanical fastening elements, heating is only applied to the second surface of the spread mechanical fastening web (i.e., the surface opposite the first surface from which the mechanical fastening elements project) to minimize any damage to the mechanical fastening elements that may result from heating. In some embodiments, the stretchable surface is heated. In these embodiments, the slit web may be arranged so that any mechanical fastening elements that may be present face away from the stretchable surface. Heating may also be carried out on a continuous web, for example, using heated rollers, for example, after the slit web is spread. Non-contact heating methods such as IR irradiation, hot air treatment, or by directing the web through a heated chamber may also be useful, for example, when the slit web is arranged so that any mechanical fastening elements that may be present face toward the stretchable surface. It may also be useful, in some embodiments, to heat the slit web before it is spread using any of these heating methods.

In some embodiments, the slit web or netting is heated, for example, by non-contact methods, while it is in contact with the stretchable surface. In embodiments in which the stretchable surface is connected to diverging disks, for example, the slit web or netting may be heated for at least a portion of the rotation in which the stretchable surface is stretching. The slit web or netting may be cooled during the last portion of the rotation or as it is removed from the stretchable surface. In these and other embodiments, chilled air may be useful, for example, to anneal the slit web as it is removed from the stretchable surface.

Figure 6:
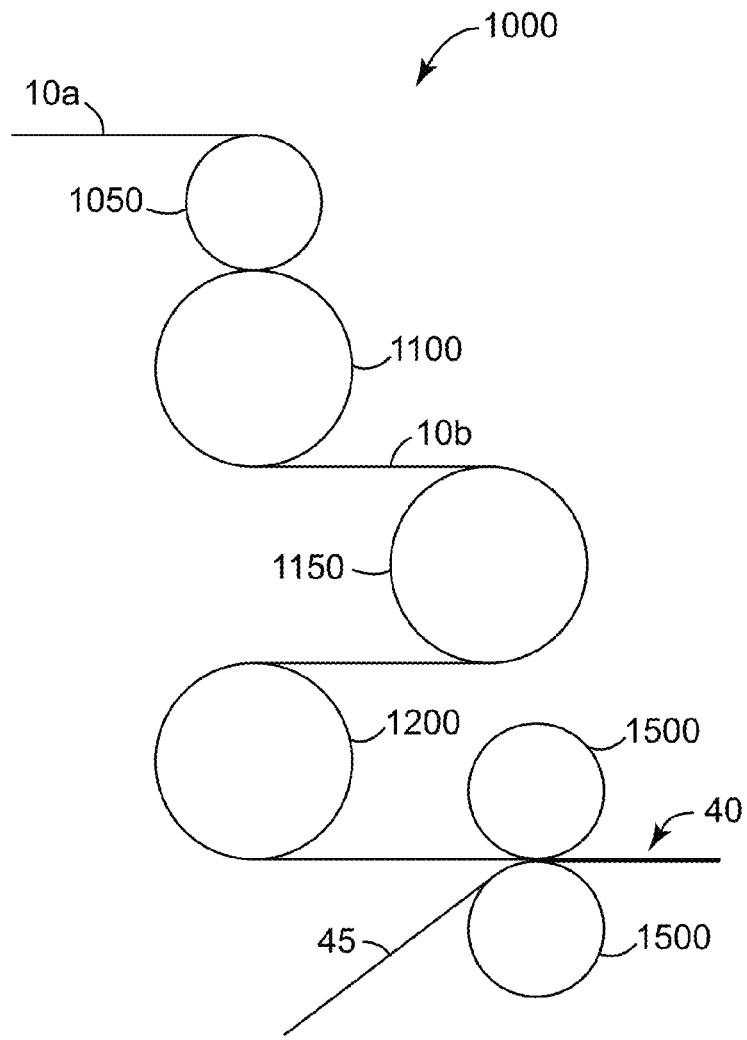
FIG. 6 is a diagrammatical view of an embodiment of the method of separating strands of a web disclosed herein.

A diagrammatical representation of an embodiment of an apparatus 1000 for carrying out the method of the present disclosure is shown in FIG. 6. In FIG. 6, slit web or netting 10a is directed over roller 1050, which may be useful, for example, for adjusting the tension in the web 10a. Slit web 10a is then spread by moving it over stretchable surface roller 1100 to provide spread web or netting 10b. The stretchable surface roller may be in accordance with FIG. 1A or other embodiments described above. Spread web or netting 10b can optionally be handled by one or more other rollers 1150, which may be a rotating heated cylinder (or heated roller) as described above. In some embodiments, roller 1150 may be a high-friction roller (e.g., comprising an elastomeric material as described above or a material with a rough surface). The high-friction roller may be heated or chilled, if desired, or may be useful at room temperature. A high-friction roller may be useful, for example, for holding the spread web in a spread configuration whether or not the web is annealed. In some embodiments, a heated, high-friction roller may be useful for annealing the spread web. In the illustrated embodiment, the spread web or netting 10b is then moved over a second stretchable surface roller 1200 where the web can be spread to a greater extent. In the illustrated embodiment, the spread web is then laminated to a carrier web 45 to form a laminate 40. In the illustrated embodiment, lamination is carried out in a nip formed by rollers 1500. In some embodiments, particularly embodiments in which the multiple strands of the slit and spread web are attached at intact bridging regions of the web, spread web can be directed onto a rotating heated cylinder optionally followed by a rotating chilled cylinder to anneal and rapidly cool the spread web before lamination.

In some embodiments, the slit web is coated with adhesive on its surface opposite the surface that contacts the stretchable surface. In some of these embodiments, mechanical fastening elements face toward the stretchable surface, and the adhesive coating faces away from the stretchable surface. In these embodiments, the non-contact heating methods described above may be useful. The spread mechanical fastening web could then come in contact with a chilled cylinder as described above before it is laminated to a carrier.

For any of the embodiments of the method of spreading a web disclosed herein in which the multiple strands of the spread web are attached at intact bridging regions of the web, the spread web may be in the form of a roll. The bridging regions interrupting the interrupted slits allow the spread web to be handled as an integral unit, for example, to be handled in roll form and converted as desired.

For any of the embodiments in which the slit web includes continuous slits and the multiple strands of the slit web are not attached to each other, laminating the spread web to a carrier immediately after it is spread on the stretchable surface roller may be useful. In these embodiments, positioning downstream roller 1150 and/or laminating roller 1500 close to the stretchable surface roller 1100 may be useful to minimize the handling of the individual separated strands. Also, although the bridging regions in the embodiments of the spread web in which the multiple strands are attached at intact bridging regions allow it to be handled as an integral unit, it may be useful to laminate the spread web to a carrier (e.g., even a sacrificial carrier) for ease of handling, for fixing the multiple strands of the spread web in a spread configuration to maintain the separation between the multiple strands, or for making a laminate for a selected application (e.g., a mechanical fastening laminate). The spread web may be joined to a carrier, for example, by lamination (e.g., extrusion lamination), adhesives (e.g., pressure sensitive adhesives), or other bonding methods (e.g., ultrasonic bonding, compression bonding, or surface bonding).

The carrier 45 may be continuous (i.e., without any through-penetrating holes) or discontinuous (e.g. comprising through-penetrating perforations or pores). The carrier may comprise a variety of suitable materials including woven webs, non-woven webs (e.g., spunbond webs, spunlaced webs, airlaid webs, meltblown web, and bonded carded webs), textiles, plastic films (e.g., single- or multilayered films, coextruded films, laterally laminated films, or films comprising foam layers), and combinations thereof. In some embodiments, including embodiments in which the laminate is a mechanical fastening laminate, the carrier is a fibrous material (e.g., a woven, nonwoven, or knit material). In some embodiments, the carrier comprises multiple layers of nonwoven materials with, for example, at least one layer of a meltblown nonwoven and at least one layer of a spunbonded nonwoven, or any other suitable combination of nonwoven materials. For example, the carrier may be a spunbond-meltbond-spunbond, spunbond-spunbond, or spunbond-spunbond-spunbond multilayer material. Or, the carrier may be a composite web comprising a nonwoven layer and a dense film layer. Fibrous materials that may provide useful carriers may be made from any of the fibers described above as useful for making loop materials. Useful carriers may have any suitable basis weight or thickness that is desired for a particular application. For a fibrous carrier, the basis weight may range, e.g., from at least about 5, 8, 10, 20, 30, or 40 grams per square meter, up to about 400, 200, or 100 grams per square meter. The carrier may be up to about 5 mm, about 2 mm, or about 1 mm in thickness and/or at least about 0.1, about 0.2, or about 0.5 mm in thickness.

In some embodiments, the slit web is directed onto a high-friction surface after at least some of the multiple strands are at least partially separated. As described above, in some embodiments, the high-friction surface is a high-friction roller. In other embodiments, the high-friction surface is an adhesive tape (that is, an adhesive disposed on a carrier). In these embodiments, the adhesive may be a pressure-sensitive adhesive, and the carrier may be any of those described above. When the slit web is directed onto an adhesive tape soon after at least some of the multiple strands are at least partially separated, annealing may not be necessary since the adhesive can keep the strands separated. In some embodiments, joining the slit web to the adhesive tape is not carried out in a nip as described above and shown in FIG. 6. Instead, in some embodiments, the laminate is nipped downweb from where the slit web is joined to the adhesive tape. This method may help to keep the laminate flat.

In some embodiments where the spread web includes a thermoplastic backing (e.g., with upstanding posts or a fibrous or foam layer thereon) the thermoplastic backing can be joined to a fibrous web carrier using surface bonding or loft-retaining bonding techniques. The term "surface-bonded" when referring to the bonding of fibrous materials means that parts of fiber surfaces of at least portions of fibers are melt-bonded to the second surface of the backing, in such a manner as to substantially preserve the original (pre-bonded) shape of the second surface of the backing, and to substantially preserve at least some portions of the second surface of the backing in an exposed condition, in the surface-bonded area. Quantitatively, surface-bonded fibers may be distinguished from embedded fibers in that at least about 65% of the surface area of the surface-bonded fiber is visible above the second surface of the backing in the bonded portion of the fiber. Inspection from more than one angle may be necessary to visualize the entirety of the surface area of the fiber. The term "loft-retaining bond" when referring to the bonding of fibrous materials means a bonded fibrous material comprises a loft that is at least 80% of the loft exhibited by the material prior to, or in the absence of, the bonding process. The loft of a fibrous material as used herein is the ratio of the total volume occupied by the web (including fibers as well as interstitial spaces of the material that are not occupied by fibers) to the volume occupied by the material of the fibers alone. If only a portion of a fibrous web has the second surface of the backing bonded thereto, the retained loft can be easily ascertained by comparing the loft of the fibrous web in the bonded area to that of the web in an unbonded area. It may be convenient in some circumstances to compare the loft of the bonded web to that of a sample of the same web before being bonded, for example, if the entirety of fibrous web has the second surface of the backing bonded thereto. In some of these embodiments, the joining comprises impinging heated gaseous fluid (e.g., ambient air, dehumidified air, nitrogen, an inert gas, or other gas mixture) onto a first surface of the fibrous web carrier while it is moving; impinging heated fluid onto the second surface of the backing while the continuous web is moving, wherein the second surface is opposite the fibrous layer, loop, or upstanding posts the backing; and contacting the first surface of the fibrous web with the second surface of the backing so that the first surface of the fibrous web is melt-bonded (e.g., surface-bonded or bonded with a loft-retaining bond) to the second surface of the backing. Impinging heated gaseous fluid onto the first surface of the fibrous web and impinging heated gaseous fluid on the second surface of the backing may be carried out sequentially or simultaneously. Further methods and apparatus for joining a continuous web to a fibrous carrier web using heated gaseous fluid may be found in U.S. Pat. Appl. Pub. Nos. 2011/0151171 (Biegler et al.) and 2011/0147475 (Biegler et al.).

In some embodiments wherein the spread web is joined to a carrier, one or more zones of the carrier may comprise one or more elastically extensible materials extending in at least one direction when a force is applied and returning to approximately their original dimension after the force is removed. However, in some embodiments, at least the portion of the carrier joined to the multiple strands of web is not stretchable. In some embodiments, the portion of carrier joined to the multiple strands will have up to a 10 (in some embodiments, up to 9, 8, 7, 6, or 5) percent elongation in the CD. In some embodiments, the carrier may be extensible but nonelastic. In other words, the carrier may have an elongation of at least 5, 10, 15, 20, 25, 30, 40, or 50 percent but substantially no recovery from the elongation (e.g., up to 10 or 5 percent recovery). Suitable extensible carriers may include nonwovens (e.g., spunbond, spunbond meltblown spunbond, or carded nonwovens). In some embodiments, the nonwoven may be a high elongation carded nonwoven (e.g., HEC). In some embodiments, the carrier is not pleated.

In some embodiments wherein the spread web is joined to a carrier, at least one of the carrier or the spread web is provided with a layer of adhesive. In some of these embodiments, the spread web is bonded to the carrier with the adhesive to form a laminate, and the adhesive is exposed between the multiple strands in the laminate. This may be useful, for example, when the web is a mechanical fastening web.

In some embodiments, the method according to the present disclosure includes cutting the spread web in the CD. In embodiments in which the spread web includes mechanical fastening elements, such converting provides a spread mechanical fastening patch. Cutting the spread web can be carried out, for example, after the spread mechanical fastening web is laminated to a carrier, and the patch can be considered a fastening laminate.

Fastening laminates made by the methods disclosed herein are useful, for example, in absorbent articles. Absorbent articles may have at least a front waist region, a rear waist region, and a longitudinal center line bisecting the front waist region and the rear waist region, wherein at least one of the front waist region or the rear waist region comprises the fastening laminate disclosed herein. The fastening laminate may be in the form of a fastening tab or landing zone that is bonded to at least one of the front waist region or the rear waist region. A fastening tab may extend outwardly from at least one of the left longitudinal edge or the right longitudinal edge of the absorbent article. In other embodiments, the fastening laminate may be an integral ear portion of the absorbent article. The carrier at the user's end of a fastening tab may exceed the extension of the spread mechanical fastening patch thereby providing a fingerlift. When the spread mechanical fastening patch is used in a fastening tab, exposed adhesive that may be present in some embodiments between the multiple strands of the spread mechanical fastening patch may be useful for "anti-flagging" or for maintaining the disposable absorbent article in a rolled up state after use. Also when the spread mechanical fastening patch is used as a landing zone or fastening tab, exposed adhesive that may be present in some embodiments between the multiple strands of the spread mechanical fastening patch may be useful to provide a combination of mechanical and adhesive fastening. The fastening laminate made by the methods disclosed herein may also be useful, for example, for disposable articles such as sanitary napkins. Mechanical fasteners and laminates made according to the present disclosure may also be useful in many other fastening applications, for example, assembly of automotive parts or any other application in which releasable attachment may be desirable.

Some Embodiments of the Disclosure

In a first embodiment, the present disclosure provides a method of separating strands of a slit web, the method comprising:

providing a slit web having a length in a machine direction, wherein the slit web comprises multiple strands provided by a plurality of slits extending in a first direction not parallel to a cross-machine direction; and running the slit web in the machine direction onto a stretchable surface, wherein the slit web is in contact with the stretchable surface for a path length in the machine direction, wherein for at least a portion of the path length, the stretchable surface is stretching in the cross-machine direction, and wherein traction between the slit web and the stretchable surface during stretching at least partially separates at least some of the multiple strands of the slit web in a second direction transverse to the first direction.

In a second embodiment, the present disclosure provides the method of the first embodiment, wherein the slit web has a width after contacting the stretchable surface that is at least five percent greater than its width before it contacts the stretchable surface.

In a third embodiment, the present disclosure the method of the first or second embodiment, wherein the slit web comprises mechanical fastening elements on at least one major surface.

In a fourth embodiment, the present disclosure provides the method of the third embodiment, wherein the slit web comprises loops.

In a fifth embodiment, the present disclosure provides the method of the third embodiment, wherein the mechanical fastening elements are male fastening elements comprising upstanding posts having bases attached to the slit web.

In a sixth embodiment, the present disclosure provides the method of the fifth embodiment, further comprising providing a thermoplastic backing having multiple rows of the upstanding posts, wherein providing the slit web comprises slitting through the web between at least some pairs of adjacent rows of the upstanding posts.

In a seventh embodiment, the present disclosure provides the method of the fifth or sixth embodiment, wherein the male fastening elements further comprise caps distal from the slit web.

In an eighth embodiment, the present disclosure provides the method of the seventh embodiment, wherein the caps have loop-engaging overhangs extending beyond the upstanding posts at a non-zero angle to the direction of the interrupted slits.

In a ninth embodiment, the present disclosure provides the method of any one of the third to eighth embodiments, wherein the slit web is arranged so that the mechanical fastening elements face away from the stretchable surface.

In a tenth embodiment, the present disclosure provides the method of any one of the third to eighth embodiments, wherein the slit web is arranged so that the mechanical fastening elements face toward the stretchable surface.

In an eleventh embodiment, the present disclosure provides the method of the tenth embodiment, wherein the slit web is coated with adhesive on its surface opposite the mechanical fastening elements.

In a twelfth embodiment, the present disclosure provides the method of any one of the first to eleventh embodiments, wherein the stretchable surface does not have a support surface contacting the stretchable surface on a side opposite a side of the stretchable surface that contacts the slit web.

In a thirteenth embodiment, the present disclosure provides the method of any one of the first to twelfth embodiments, wherein at least some of the multiple strands of the slit web are not attached to each other.

In a fourteenth embodiment, the present disclosure provides the method of any one of the first to twelfth embodiments, wherein the plurality of slits are interrupted by intact bridging regions of the web, wherein for at least some adjacent interrupted slits, the intact bridging regions are staggered in a direction transverse to the first direction, and wherein the stretching provides a spread web comprising multiple strands of the slit web attached to each other at least at some of the intact bridging regions and separated from each other between at least some of the intact bridging regions.

In a fifteenth embodiment, the present disclosure provides the method of the fourteenth embodiment, wherein the intact bridging regions divide the interrupted slits into a series of slit portions aligned in the first direction, and wherein a ratio of a length of the slit portions to a width of one of the multiple strands is at least 2 to 1.

In a sixteenth embodiment, the present disclosure provides the method of the fourteenth or fifteenth embodiment, wherein the multiple strands of the slit web attached to each other at least at some of the intact bridging regions form an angle of less than 90 degrees.

In a seventeenth embodiment, the present disclosure provides the method of any one of the first to sixteenth embodiments, wherein stretchable surface comprises an elastomer.

In an eighteenth embodiment, the present disclosure provides the method of any one of the first to seventeenth embodiments, wherein the stretchable surface is provided by at least one stretchable band, stretchable tubing, at least one coiled spring, or a combination thereof.

In a nineteenth embodiment, the present disclosure provides the method of any one of the first to eighteenth embodiments, wherein the slit web is run onto at least two different stretchable surfaces.

In a twentieth embodiment, the present disclosure provides the method of any one of the first to nineteenth embodiments, wherein running the slit web in the machine direction comprises running the slit web onto a roller comprising two rotating diverging disks that are laterally spaced and have the stretchable surface between them that stretches in the cross-machine direction for a portion of a rotation of the two rotating diverging disks.

In a twenty-first embodiment, the present disclosure provides the method of the twentieth embodiment, wherein at least one diverging disk has an angle to the machine direction of at least one degree.

In a twenty-second embodiment, the present disclosure provides the method of the twentieth or twenty-first embodiment, wherein there are multiple stretchable bands, stretchable tubing, multiple coiled springs, or a combination thereof attached to the diverging disks that provide the stretchable surface.

In a twenty-third embodiment, the present disclosure provides the method of the twentieth or twenty-first embodiment, wherein the stretchable surface is a sleeve connected to the two rotating diverging disks.

In a twenty-fourth embodiment, the present disclosure provides the method of any one of the twentieth to twenty-third embodiments, wherein a distance between the two diverging disks' peripheral surfaces at a point of greatest separation is at least 25 percent greater than a distance between the two diverging disks' peripheral surfaces at a point of least separation.

In a twenty-fifth embodiment, the present disclosure provides the method of any one of the twentieth to twenty-fourth embodiments, wherein the roller is an idler roller.

In a twenty-sixth embodiment, the present disclosure provides the method of any one of the twentieth to twenty-fifth embodiments, wherein after at least some of the multiple strands are at least partially separated, the method further comprises running the slit web over a second roller comprising two rotating diverging disks that are laterally spaced and have a stretchable surface between them that stretches in the cross-machine direction for a portion of a rotation of the two rotating diverging disks, wherein at least a portion of at least some of the multiple strands of the slit web are further separated on the second roller.

In a twenty-seventh embodiment, the present disclosure provides the method of any one of the first to nineteenth embodiments, wherein the stretchable surface is stretched on a conveyor belt apparatus.

In a twenty-eighth embodiment, the present disclosure provides the method of any one of the first to twenty-seventh embodiments, further comprising heating the slit web before, while, or after at least some of the multiple strands are at least partially separated.

In a twenty-ninth embodiment, the present disclosure provides the method of the twenty-eighth embodiment, wherein heating anneals the slit web after at least some of the multiple strands are at least partially separated.

In a thirtieth embodiment, the present disclosure provides the method of the twenty-eighth or twenty-ninth embodiment, wherein heating comprises running the slit web onto a rotating heated cylinder after at least some of the multiple strands are at least partially separated.

In a thirty-first embodiment, the present disclosure provides the method of the twenty-eighth or twenty-ninth embodiment, wherein heating the slit web comprises using non-contact heating.

In a thirty-second embodiment, the present disclosure provides the method of any one of the first to thirty-first embodiments, wherein at least some of the multiple strands are at least partially separated such that that the width of the slit web is up to 200 percent greater after the slit web contacts the stretchable surface.

In a thirty-third embodiment, the present disclosure provides the method of any one of the first to thirty-second embodiments, wherein the first direction is the machine direction.

In a thirty-fourth embodiment, the present disclosure provides the method of any one of the first to thirty-third embodiments, wherein there is no macroscopic stretch-induced molecular orientation in the slit web in the cross-direction after at least some of the multiple strands are at least partially separated.

In a thirty-fifth embodiment, the present disclosure provides the method of any one of the first to thirty-fourth embodiments, further comprising directing the slit web onto a high-friction surface after at least some of the multiple strands are at least partially separated.

In a thirty-sixth embodiment, the present disclosure provides the method of the thirty-fifth embodiment, wherein the high-friction surface is a heated high-friction roller.

In a thirty-seventh embodiment, the present disclosure provides the method of the thirty-fifth embodiment, wherein the high-friction surface is a chilled high-friction roller.

In a thirty-eighth embodiment, the present disclosure provides the method of any one of the first to thirty-seventh embodiments, further comprising directing the slit web onto a rotating chilled cylinder.

In a thirty-ninth embodiment, the present disclosure provides the method of any one of the first to thirty-eighth embodiments, further comprising laminating the slit web to a carrier after at least some of the multiple strands are at least partially separated.

In a fortieth embodiment, the present disclosure provides the method of the thirty-ninth embodiment, wherein the carrier is a nonwoven web.

In a forty-first embodiment, the present disclosure provides the method of the thirty-ninth or fortieth embodiment, wherein the carrier is provided with a layer of adhesive, wherein the slit web is bonded to the carrier with the adhesive to form a laminate, and wherein the adhesive is exposed between the multiple strands in the laminate.

In a forty-second embodiment, the present disclosure provides the method of any one of the thirty-ninth to forty-first embodiments, wherein the laminate is directed through a nip downweb from where the slit web is bonded to the carrier.

In a forty-third embodiment, the present disclosure provides a method of increasing a width of a polymeric netting, the method comprising:

providing a polymeric netting having a length in a machine direction; and running the polymeric netting in the machine direction onto a stretchable surface, wherein the polymeric netting is in contact with the stretchable surface for a path length in the machine direction, wherein for at least a portion of the path length, the stretchable surface is stretching in the cross-machine direction, and wherein traction between the polymeric netting and the stretchable surface during stretching increases the width of at least a portion of the polymeric netting in the cross-machine direction.

In a forty-fourth embodiment, the present disclosure provides the method of the forty-third embodiment, wherein the polymeric netting has a width after contacting the stretchable surface that is at least five percent greater than its width before it contacts the stretchable surface.

In a forty-fifth embodiment, the present disclosure the method of the forty-third or forty-fourth embodiment, wherein the polymeric netting comprises mechanical fastening elements on at least one major surface.

In a forty-sixth embodiment, the present disclosure provides the method of the forty-fifth embodiment, wherein the polymeric netting comprises loops.

In a forty-seventh embodiment, the present disclosure provides the method of the forty-fifth embodiment, wherein the mechanical fastening elements are male fastening elements comprising upstanding posts having bases attached to the polymeric netting.

In a forty-eighth embodiment, the present disclosure provides the method of the forty-seventh embodiment, wherein the male fastening elements further comprise caps distal from the polymeric netting.

In a forty-ninth embodiment, the present disclosure provides the method of any one of the forty-fifth to forty-eighth embodiments, wherein the polymeric netting is arranged so that the mechanical fastening elements face away from the stretchable surface.

In a fiftieth embodiment, the present disclosure provides the method of any one of the forty-fifth to forty-eighth embodiments, wherein the polymeric netting is arranged so that the mechanical fastening elements face toward the stretchable surface.

In fifty-first embodiment, the present disclosure provides the method of the fiftieth embodiment, wherein the polymeric netting is coated with adhesive on its surface opposite the mechanical fastening elements.

In a fifty-second embodiment, the present disclosure provides the method of any one of the forty-third to fifty-first embodiments, wherein the stretchable surface does not have a support surface contacting the stretchable surface on a side opposite a side of the stretchable surface that contacts the polymeric netting.

In a fifty-third embodiment, the present disclosure provides the method of any one of the forty-third to fifty-second embodiments, wherein the polymeric netting comprises multiple strands of a slit web attached to each other at intact bridging regions and separated from each other between at least some of the intact bridging regions.

In a fifty-fourth embodiment, the present disclosure provides the method of any one of the forty-third to fifty-third embodiments, wherein stretchable surface comprises an elastomer.

In a fifty-fifth embodiment, the present disclosure provides the method of any one of the forty-third to fifty-fourth embodiments, wherein the stretchable surface is provided by at least one stretchable band, stretchable tubing, at least one coiled spring, or a combination thereof.

In a fifty-sixth embodiment, the present disclosure provides the method of any one of the forty-third to fifty-fifth embodiments, wherein the polymeric netting is run onto at least two different stretchable surfaces.

In a fifty-seventh embodiment, the present disclosure provides the method of any one of the forty-third to fifty-sixth embodiments, wherein running the polymeric netting in the machine direction comprises running the polymeric netting onto a roller comprising two rotating diverging disks that are laterally spaced and have the stretchable surface between them that stretches in the cross-machine direction for a portion of a rotation of the two rotating diverging disks.

In a fifty-eighth embodiment, the present disclosure provides the method of the fifty-seventh embodiment, wherein at least one diverging disk has an angle to the machine direction of at least one degree.

In a fifty-ninth embodiment, the present disclosure provides the method of the fifty-seventh or fifty-eighth embodiment, wherein there are multiple stretchable bands, stretchable tubing, multiple coiled springs, or a combination thereof attached to the diverging disks that provide the stretchable surface.

In a sixtieth embodiment, the present disclosure provides the method of the fifty-seventh or fifty-eighth embodiment, wherein the stretchable surface is a sleeve connected to the two rotating diverging disks.

In a sixty-first embodiment, the present disclosure provides the method of any one of the fifty-seventh to sixtieth embodiments, wherein a distance between the two diverging disks' peripheral surfaces at a point of greatest separation is at least 25 percent greater than a distance between the two diverging disks' peripheral surfaces at a point of least separation.

In a sixty-second embodiment, the present disclosure provides the method of any one of the fifty-seventh to sixty-first embodiments, wherein the roller is an idler roller.

In a sixty-third embodiment, the present disclosure provides the method of any one of the fifty-seventh to sixty-second embodiments, further comprises running the polymeric netting over a second roller comprising two rotating diverging disks that are laterally spaced and have a stretchable surface between them that stretches in the cross-machine direction for a portion of a rotation of the two rotating diverging disks, and wherein traction between the polymeric netting and the stretchable surface of the second roller during stretching further increases the width of at least a portion of the polymeric netting in the cross-machine direction.

In a sixth-fourth embodiment, the present disclosure provide the method any one of the forty-third to fifty-sixth embodiments, wherein the stretchable surface is stretched on a conveyor belt apparatus.

In a sixty-fifth embodiment, the present disclosure provides the method of any one of the forty-third to sixty-fourth embodiments, further comprising heating the polymeric netting before, during, or after increasing the width of the polymeric netting.

In a sixty-sixth embodiment, the present disclosure provides the method of the sixty-fifth embodiment, wherein heating anneals the polymeric after the width of the polymeric netting is increased.

In a sixty-seventh embodiment, the present disclosure provides the method of the sixty-fifth or sixty-sixth embodiment, wherein heating comprises running the polymeric netting onto a rotating heated cylinder after the width of the polymeric netting is increased.

In a sixty-eighth embodiment, the present disclosure provides the method of the sixty-fifth or sixty-sixth embodiment, wherein heating the polymeric netting comprises using non-contact heating.

In a sixty-ninth embodiment, the present disclosure provides the method of any one of the forty-third to sixty-eighth embodiments, wherein width of the polymeric netting is increased up to 200 percent.

In a seventieth embodiment, the present disclosure provides the method of any one of the forty-third to sixty-ninth embodiments, wherein the first direction is the machine direction.

In a seventy-first embodiment, the present disclosure provides the method of any one of the forty-third to seventieth embodiments, wherein there is no macroscopic stretch-induced molecular orientation in the polymeric netting in the cross-direction after the width of the polymeric netting is increased.

In a seventy-second embodiment, the present disclosure provides the method of any one of the forty-third to seventy-first embodiments, further comprising directing the polymeric netting onto a high-friction surface after the width of the polymeric netting is increased.

In a seventy-third embodiment, the present disclosure provides the method of the seventy-second embodiment, wherein the high-friction surface is a heated high-friction roller.

In a seventy-fourth embodiment, the present disclosure provides the method of the seventy-second embodiment, wherein the high-friction surface is a chilled high-friction roller.

In a seventy-fifth embodiment, the present disclosure provides the method of any one of the forty-third to seventy-fourth embodiments, further comprising directing the polymeric netting onto a rotating chilled cylinder.

In a seventy-sixth embodiment, the present disclosure provides the method of any one of the forty-third to seventy-fifth embodiments, further comprising laminating the polymeric netting to a carrier after the width of the polymeric netting is increased.

In a seventy-seventh embodiment, the present disclosure provides the method of the seventy-sixth embodiment, wherein the carrier is a nonwoven web.

In a seventy-eighth embodiment, the present disclosure provides the method of the seventy-sixth or seventy-seventh embodiment, wherein the carrier is provided with a layer of adhesive, wherein the polymeric netting is bonded to the carrier with the adhesive to form a laminate, and wherein the adhesive is exposed between intersecting strands in the polymeric netting.

In a seventy-ninth embodiment, the present disclosure provides the method of any one of the seventy-sixth to seventy-eighth embodiments, wherein the laminate is directed through a nip downweb from where the polymeric netting is bonded to the carrier.

This disclosure is not limited to the above-described embodiments but is to be controlled by the limitations set forth in the following claims and any equivalents thereof. This disclosure may be suitably practiced in the absence of any element not specifically disclosed herein.

What is claimed is:

1. A method of separating strands of a slit web, the method comprising:
   providing a slit web having a length in a machine direction, wherein the slit web comprises multiple strands provided by a plurality of slits extending in a first direction not parallel to a cross-machine direction; and
   running the slit web in the machine direction onto a stretchable surface, wherein the slit web is in contact with the stretchable surface for a path length in the machine direction, wherein for at least a portion of the path length, the stretchable surface stretches in the cross-machine direction, and wherein traction between the slit web and the stretchable surface during stretching at least partially separates at least some of the multiple strands of the slit web in a second direction transverse to the first direction.

2. The method of claim 1, wherein the slit web has a width after contacting the stretchable surface that is at least five percent greater than its width before it contacts the stretchable surface.

3. The method of claim 1, wherein the slit web comprises mechanical fastening elements on at least one major surface.

4. The method of claim 3, wherein the mechanical fastening elements are male fastening elements comprising upstanding posts having bases attached to the slit web.

5. The method of claim 3, wherein the slit web is coated with adhesive on its major surface opposite the mechanical fastening elements.

6. The method of claim 1, wherein the stretchable surface does not have a support surface contacting the stretchable surface on a side opposite a side of the stretchable surface that contacts the slit web.

7. The method of claim 1, wherein the plurality of slits are interrupted by intact bridging regions of the web, wherein for at least some adjacent interrupted slits, the intact bridging regions are staggered in a direction transverse to the first direction, and wherein the stretching provides a spread web comprising multiple strands of the slit web attached to each other at least at some of the intact bridging regions and separated from each other between at least some of the intact bridging regions.

8. The method of claim 7, wherein the intact bridging regions divide the interrupted slits into a series of slit portions aligned in the first direction, and wherein a ratio of a length of the slit portions to a width of one of the multiple strands is at least 2 to 1.

9. The method of claim 1, wherein at least some of the multiple strands of the slit web are not attached to each other.

10. The method of claim 1, wherein the stretchable surface is provided by at least one stretchable band, stretchable tubing, at least one coiled spring, or a combination thereof.

11. The method of claim 1, wherein running the slit web in the machine direction comprises running the slit web onto a roller comprising two rotating diverging disks that are laterally spaced and have the stretchable surface between them that stretches in the cross-machine direction for a portion of a rotation of the two rotating diverging disks.

12. The method of claim 11, wherein there are multiple stretchable bands, stretchable tubing, multiple coiled springs, or a combination thereof attached to the diverging disks that provide the stretchable surface.

13. The method of claim 11, wherein the stretchable surface is a sleeve connected to the two rotating diverging disks.

14. The method of claim 11, wherein a distance between the two diverging disks' peripheral surfaces at a point of greatest separation is at least 25 percent greater than a distance between the two diverging disks' peripheral surfaces at a point of least separation.

15. The method of claim 1, wherein the stretchable surface is stretched on a conveyor belt apparatus.

16. The method of claim 1, wherein stretchable surface comprises an elastomer.

17. The method of claim 1, further comprising directing the slit web onto a high-friction surface after at least some of the multiple strands are at least partially separated.

18. The method of claim 1, further comprising laminating the slit web to a carrier after at least some of the multiple strands are at least partially separated.

19. The method of claim 18, wherein the carrier is provided with a layer of adhesive, wherein the slit web is bonded to the carrier with the adhesive to form a laminate, and wherein the adhesive is exposed between the multiple strands in the laminate.

20. The method of claim 19, wherein the laminate is directed through a nip downweb from where the slit web is bonded to the carrier.

21. A method of increasing a width of a polymeric netting, the method comprising:

providing a polymeric netting having a length in a machine direction; and running the polymeric netting in the machine direction onto a stretchable surface, wherein the polymeric netting is in contact with the stretchable surface for a path length in the machine direction, wherein for at least a portion of the path length, the stretchable surface stretches in the cross-machine direction, and wherein traction between the polymeric netting and the stretchable surface during stretching increases the width of at least a portion of the polymeric netting in the cross-machine direction.

* * * * *